(12) United States Patent
Lemke et al.

(10) Patent No.: US 7,861,679 B2
(45) Date of Patent: *Jan. 4, 2011

(54) CYLINDER AND PISTON ASSEMBLIES FOR OPPOSED PISTON ENGINES

(75) Inventors: James U. Lemke, La Jolla, CA (US); Ronald J. Hoffman, Scottsdale, AZ (US); Michael H. Wahl, Bonita, CA (US); Patrick R. Lee, San Diego, CA (US)

(73) Assignee: Achates Power, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/586,352

(22) Filed: Sep. 21, 2009

(65) Prior Publication Data

US 2010/0012055 A1   Jan. 21, 2010

Related U.S. Application Data

(63) Continuation of application No. 12/075,374, filed on Mar. 11, 2008, now Pat. No. 7,591,235, which is a continuation of application No. 11/378,959, filed on Mar. 17, 2006, now Pat. No. 7,360,511, which is a continuation-in-part of application No. PCT/US2005/020553, filed on Jun. 10, 2005, and a continuation-in-part of application No. 10/865,707, filed on Jun. 10, 2004, now Pat. No. 7,156,056.

(51) Int. Cl.
*F01P 1/04* (2006.01)
*F01P 1/06* (2006.01)

(52) U.S. Cl. .................. 123/41.35; 123/193.4

(58) Field of Classification Search ........... 123/41.35, 123/41.34, 51 AA, 67, 197.4, 193.4; 92/179, 92/187

See application file for complete search history.

(56) References Cited

U.S. PATENT DOCUMENTS 704,713 A   7/1902   Klein ............... 123/41.35

(Continued)

FOREIGN PATENT DOCUMENTS

CH   20385   10/1899

(Continued)

OTHER PUBLICATIONS

J.F. Butler, E.P. Crowdy; *The Doxford Seahorse Engine*, paper presented at a joint meeting of the Institute and N.E.C.I.E.S. on Nov. 8-9, 1971 pp. 73-115.

(Continued)

*Primary Examiner*—Mahmoud Gimie
(74) *Attorney, Agent, or Firm*—Terrance A. Meador; INCAPLAW

(57) ABSTRACT

In an opposed piston engine, a pair of pistons are disposed in opposition in the bore of a cylinder. The cylinder includes first liquid coolant grooves having a first cooling capacity to cool a portion of the cylinder extending from a central portion toward an exhaust port, and second liquid coolant grooves having a second cooling capacity, less than the first cooling capacity, to cool a portion of the cylinder extending from the central portion toward an inlet port. Each piston includes a cylindrical skirt with a crown and an open end opposite the crown, a piston rod with a bore, a first end attached to a back surface of the crown, and a second end extending through the open end of the skirt, a radial array of liquid coolant flow passages in communication with the bore and disposed between the first end and the back surface of the crown, and a single wristpin retained on the second end section of the piston rod and positioned externally to the piston.

20 Claims, 20 Drawing Sheets

U.S. PATENT DOCUMENTS

| | | | |
|---|---|---|---|
| 1,231,903 A | 7/1917 | Junkers | |
| 1,386,062 A | 8/1921 | Junkers | |
| 1,410,019 A * | 3/1922 | Krause | 744/44 |
| 1,410,319 A | 3/1922 | Junkers | |
| 1,495,326 A | 5/1924 | Junkers | |
| 1,683,040 A | 9/1928 | Junkers | |
| 1,704,325 A | 3/1929 | Junkers | |
| 1,796,603 A | 3/1931 | Junkers | |
| 1,808,380 A | 6/1931 | Royal | |
| 1,818,558 A | 9/1931 | Junkers | |
| 1,892,277 A | 12/1932 | Junkers | |
| 1,956,355 A | 4/1934 | Junkers | 309/33 |
| 1,981,870 A | 11/1934 | Magdeburger | 92/84 |
| 2,031,318 A | 2/1936 | Junkers | 123/51 |
| 2,048,002 A * | 7/1936 | Frit | 123/41.38 |
| 2,056,056 A | 9/1936 | Ballou | 123/51 BA |
| 2,076,334 A | 4/1937 | Burns | 123/51 B |
| 2,160,380 A * | 5/1939 | Colburn | 123/51 BB |
| 2,169,807 A | 8/1939 | Lyon | 417/488 |
| 2,244,323 A | 6/1941 | Antonsen et al. | 123/173 |
| 2,283,432 A | 5/1942 | Gerlach et al. | 309/33 |
| 2,374,460 A * | 4/1945 | Rossman | 123/51 BB |
| 2,398,640 A | 4/1946 | Hickey | 123/48 B |
| 2,417,910 A | 3/1947 | Bruegger | 74/44 |
| 2,423,395 A | 7/1947 | Lieberherr | 123/173 |
| 2,473,760 A * | 6/1949 | Marion | 123/51 BA |
| 2,653,484 A * | 9/1953 | Zecher | 74/40 |
| 2,788,773 A | 4/1957 | Meurer | 123/41.35 |
| 3,023,743 A | 3/1962 | Schauer | 123/51 |
| 3,065,743 A | 11/1962 | Brehm | 123/41.35 |
| 3,084,678 A * | 4/1963 | Linsay | 123/51 BA |
| 3,117,566 A | 1/1964 | Vendendiger | 123/51 BA |
| 3,182,642 A | 5/1965 | Drtina | 123/41.35 |
| 3,209,736 A | 10/1965 | Witzky | 123/48 R |
| 3,221,718 A | 12/1965 | Isley | 123/32 |
| 3,359,957 A * | 12/1967 | Albrecht-Wolfgang | 123/51 BA |
| 3,369,530 A | 2/1968 | Campbell | 123/6 |
| 3,520,285 A | 7/1970 | Klauder | 123/56 |
| 3,528,394 A | 9/1970 | Cummins | 123/51 A |
| 3,534,715 A | 10/1970 | Antonsen et al. | 123/41.79 |
| 3,777,722 A | 12/1973 | Lenger | 123/46 |
| 3,983,793 A | 10/1976 | Beardmore | 92/169 |
| 4,010,611 A | 3/1977 | Zachery | 60/516 |
| 4,010,718 A | 3/1977 | Stewart | 123/41.35 |
| 4,090,479 A | 5/1978 | Kaye | 123/306 |
| 4,204,487 A | 5/1980 | Jones | 123/41.35 |
| 4,215,660 A * | 8/1980 | Finley | 123/78 E |
| 4,375,792 A | 3/1983 | Barret | 123/51 AA |
| 4,508,065 A | 4/1985 | Sudchev | 123/41.35 |
| 4,694,785 A | 9/1987 | Timmerman et al. | 123/52 |
| 4,794,896 A | 1/1989 | Tsai et al. | 123/193 |
| 4,908,923 A | 3/1990 | Anderson | 29/888.01 |
| 5,017,758 A | 5/1991 | Kirkman | 219/205 |
| 5,042,441 A | 8/1991 | Paul et al. | 123/276 |
| 5,058,536 A * | 10/1991 | Johnston | 123/51 BA |
| 5,058,537 A | 10/1991 | Paul et al. | 123/51 |
| 5,355,854 A | 10/1994 | Aubee | 123/431 |
| 5,442,993 A | 8/1995 | Baliotti et al. | 92/84 |
| 5,533,472 A | 7/1996 | Sands et al. | 123/41.35 |
| 5,806,631 A | 9/1998 | Yoshida et al. | 184/18 |
| 5,826,556 A | 10/1998 | Ruman et al. | 123/196 |
| 5,884,550 A | 3/1999 | Northam | 92/212 |
| 5,915,345 A | 6/1999 | Kling et al. | 123/41.35 |
| 6,039,011 A | 3/2000 | Agalarov et al. | 123/51 AA |
| 6,170,443 B1 | 1/2001 | Hofbauer | 123/51 B |
| 6,182,619 B1 | 2/2001 | Spitzer et al. | 123/51 |
| 6,276,260 B1 | 8/2001 | Bianchi | 92/187 |
| 6,283,478 B1 | 9/2001 | Kumai et al. | 277/435 |
| 6,311,761 B1 * | 11/2001 | Steininger et al. | 164/312 |
| 6,418,885 B1 | 7/2002 | Paul et al. | 123/25 C |
| 6,481,389 B2 | 11/2002 | Suzuki et al. | 123/41.35 |
| 6,662,762 B2 | 12/2003 | Schuko | 123/56.1 |
| 7,047,916 B2 | 5/2006 | Pischinger et al. | 123/46 R |
| 7,156,056 B2 | 1/2007 | Lemke et al. | 123/41.35 |
| 7,207,299 B2 | 4/2007 | Hofbauer | 123/46 E |
| 7,255,070 B2 | 8/2007 | Hofbauer | 123/46 R |
| 7,270,108 B2 | 9/2007 | Lemke | 123/299 |
| 7,334,570 B2 | 2/2008 | Klyza | 123/467 |
| 7,360,511 B2 | 4/2008 | Lemke et al. | 123/41.35 |
| 7,383,796 B2 | 6/2008 | Hofbauer | 123/46 R |
| 7,434,550 B2 | 10/2008 | Hofbauer | 123/51 R |
| 7,469,664 B2 | 12/2008 | Hofbauer et al. | 123/54.1 |
| 7,509,937 B2 | 3/2009 | Hofbauer | 123/196 R |
| 7,546,819 B2 | 6/2009 | Lemke et al. | 123/41.35 |
| 7,549,401 B2 | 6/2009 | Lemke et al. | 123/41.34 |
| 7,578,267 B2 | 8/2009 | Hofbauer | 123/51 BC |
| 7,591,235 B2 | 9/2009 | Lemke et al. | 123/41.35 |
| 7,735,834 B2 | 6/2010 | Hofbauer | 277/438 |
| 2004/0011308 A1 | 1/2004 | Hausler et al. | 123/73 |
| 2005/0274332 A1 | 12/2005 | Lemke et al. | 123/41.35 |
| 2006/0157003 A1 | 6/2006 | Lemke et al. | 123/41.38 |
| 2007/0039572 A1 | 2/2007 | Lemke et al. | 123/51 BB |
| 2007/0245892 A1 | 10/2007 | Lemke et al. | 92/169.1 |
| 2008/0017164 A1 | 1/2008 | Hofbauer | 123/196 R |
| 2008/0035101 A1 | 2/2008 | Hausler et al. | 123/196 |
| 2008/0041346 A1 | 2/2008 | Hofbauer | 123/51 BC |
| 2008/0127947 A1 | 6/2008 | Hofbauer et al. | 123/51 BC |
| 2008/0163848 A1 | 7/2008 | Lemke et al. | 123/197.3 |
| 2008/0314688 A1 | 12/2008 | Lemke et al. | 184/6.8 |
| 2009/0183491 A1 | 7/2009 | Hofbauer | 60/39.52 |
| 2009/0293820 A1 | 12/2009 | Lemke et al. | 12/41.35 |
| 2010/0012055 A1 | 12/2010 | Lemke et al. | 123/41.35 |

FOREIGN PATENT DOCUMENTS

| | | |
|---|---|---|
| DE | 11054 | 9/1880 |
| DE | 195 47 186 | 7/1988 |
| DE | 424 3571 | 12/1992 |
| DE | 199 62 325 | 7/2001 |
| EP | 0609866 A1 | 8/1994 |
| EP | 0747591 A1 | 12/1996 |
| EP | 0943788 A1 | 9/1999 |
| GB | 5941 AD 1913 | 0/1914 |
| GB | 3720 | 3/1900 |
| GB | 10974 AD 1914 | 5/1918 |
| GB | 147733 | 2/1921 |
| GB | 173226 | 2/1923 |
| GB | 147730 | 3/1926 |
| GB | 348084 | 10/1931 |
| GB | 348097 | 10/1931 |
| GB | 558 115 | 12/1943 |
| GB | 779 631 A | 7/1957 |
| JP | 58-1709681 | 10/1983 |
| WO | WO 00/28194 A1 | 5/2000 |
| WO | WO 00/68553 A1 | 11/2000 |
| WO | WO 01/75284 | 10/2001 |
| WO | WO 2005/103456 | 11/2005 |
| WO | WO 2005/124124 A1 | 12/2005 |
| WO | WO 2007/109122 A2 | 9/2007 |

OTHER PUBLICATIONS

J. K. Parker, S. R. Bell, D. M. Davis; *An Opposed Piston Diesel Engine*, ICE vol. 18, New Developments in Off-Highway Engines, ASME 1992, pp. 17-24.

J. C. McLanahan, Salem State College; *Diesel Aircraft Engine: A Delayed Promise from the 1930's*, SAE International and American Institute if Aeronautics, 1999-01-5583, pp. 1-10.

W.W. Pulkrabek, *Engineering Fundamentals of the Internal Combustion Engine*, Second Edition, 2004, pp. 5-11.

*Wickipedia*, the article entitled "Opposed Piston Engine", last update Jul. 12, 2007, printed Jul. 30, 2007, pp. 1-4.

International Search Report and Written Opinion of the ISA, PCT/US2005/020553, mailed Nov. 24, 2005.

International Preliminary Report on Patentability, PCT/US2007/006618, mailed Feb. 1, 2008.
English Translation of First Office Action in PRC application 200580023840.9, mailed Jul. 25, 2008.
Chinese Abstract of CN 1077214C.
English summary of Applicant's response to the first Office Action in PRC application 200580023840.9, with replacement claims.
English Translation of Second Office Action in PRC application 200580023840.9, mailed Jul. 17, 2009.

English translation of claims in PRC patent CN 1985082 B.
First Examination Report in EP application 05757692.8, mailed Sep. 5, 2008.
Applicant's response to the first Examination Report in EP application 05757692.8, submitted Dec. 18, 2008.

* cited by examiner

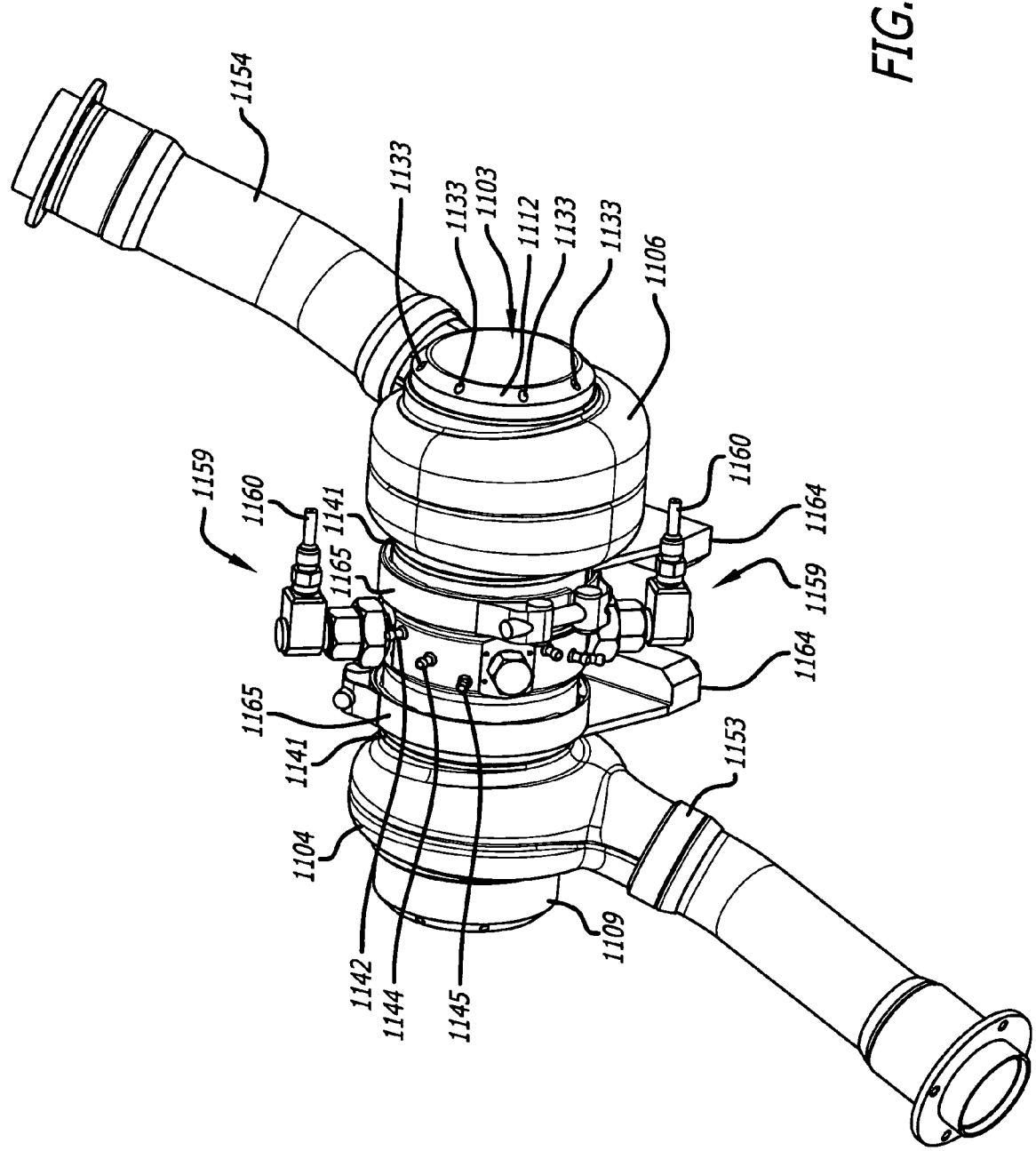

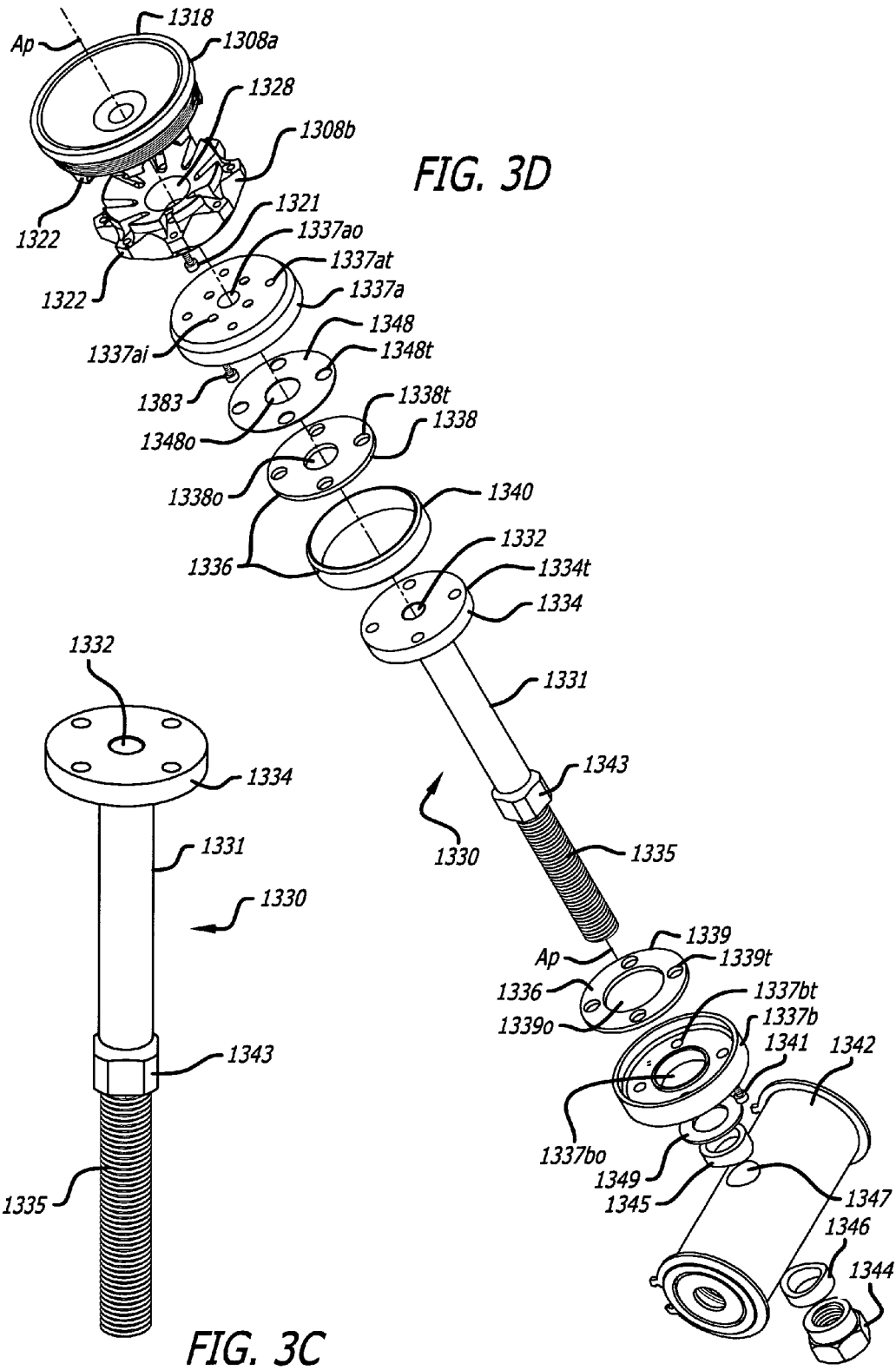

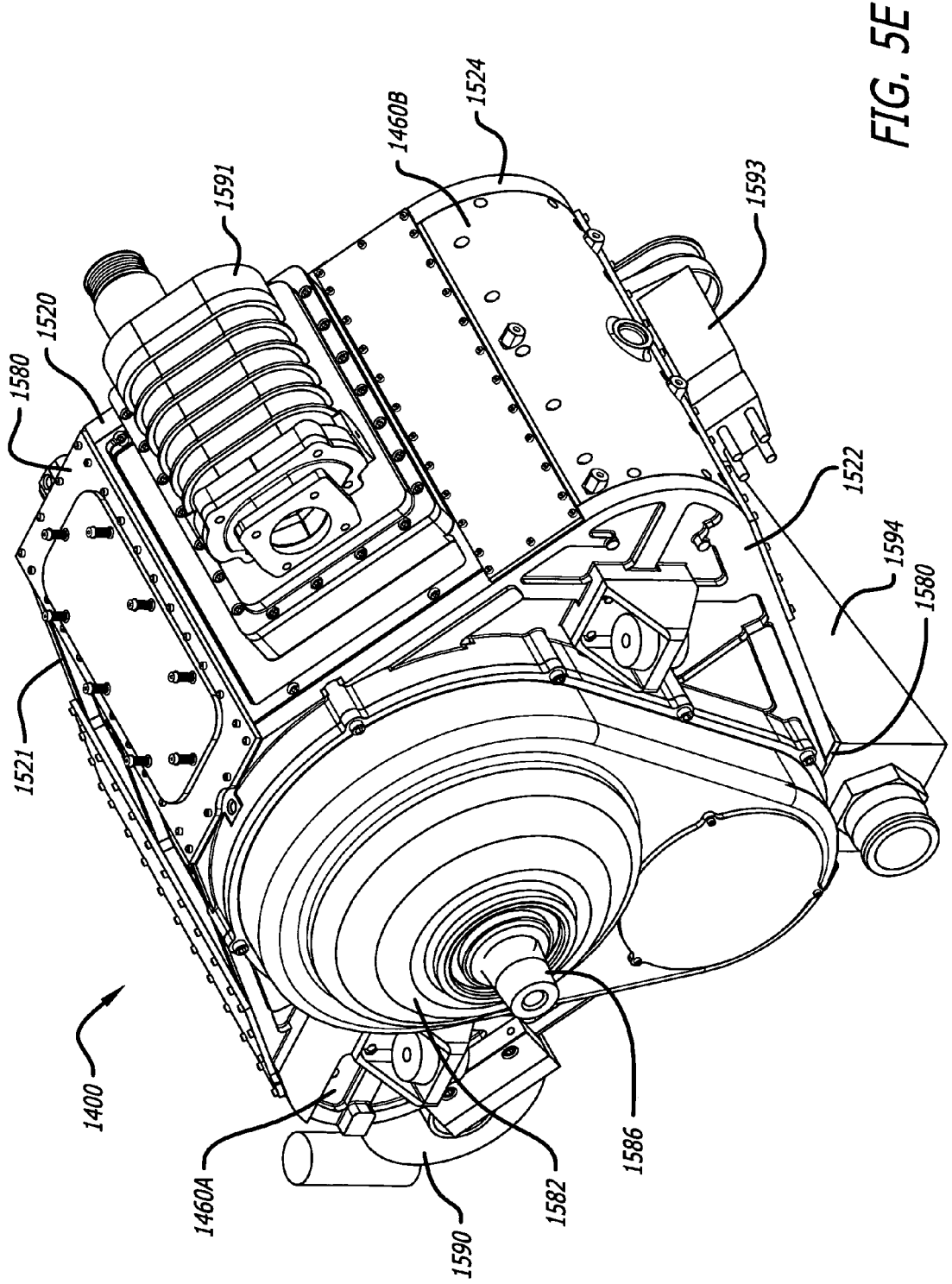

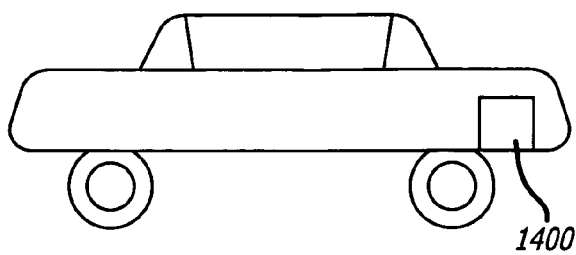
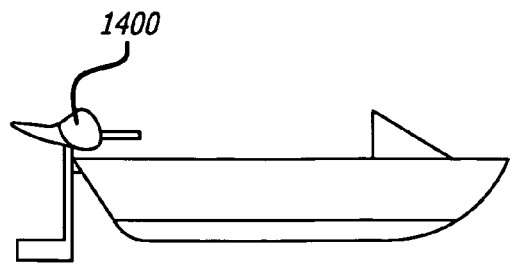
FIG. 8A   FIG. 8B
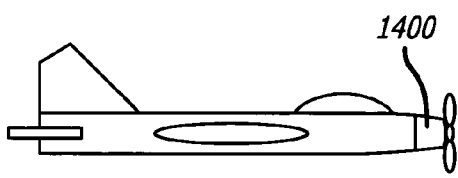
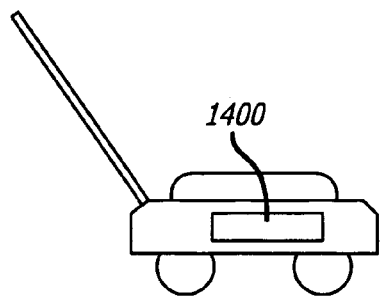
FIG. 8C   FIG. 8D
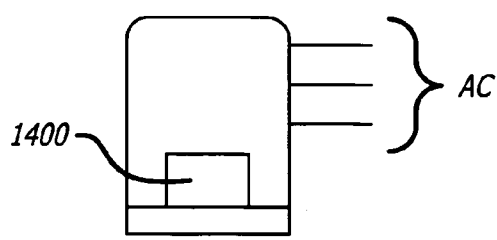
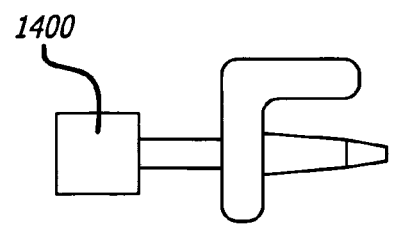
FIG. 8E   FIG. 8F

CYLINDER AND PISTON ASSEMBLIES FOR OPPOSED PISTON ENGINES

PRIORITY

This application is a continuation of U.S. patent application Ser. No. 12/075,374, filed Mar. 11, 2008, now U.S. Pat. No. 7,591,235, which is a continuation of U.S. patent application Ser. No. 11/378,959, filed Mar. 17, 2006, now U.S. Pat. No. 7,360,511, which claims priority under 35 U.S.C. §119 as a Continuation-in-Part of PCT Patent Application PCT/US2005/020553, filed Jun. 10, 2005, entitled "Improved Two-Cycle, Opposed Piston, Internal-combustion Engine", the US national phase of which is U.S. patent application Ser. No. 11/629,136, now U.S. Pat. No. 7,549,401, and also claims priority under 35 U.S.C. §120 as a continuation-in-part of U.S. patent application Ser. No. 10/865,707, filed Jun. 10, 2004, for "Two-Cycle, Opposed Piston, Internal-Combustion Engine," now U.S. Pat. No. 7,156,056, the disclosures of both of which are incorporated by reference in their entirety. The following patent applications and issued patents, all commonly assigned to the assignee of this application, contain subject matter related to the subject matter of this application.

RELATED PATENT APPLICATIONS AND PATENTS

U.S. patent application Ser. No. 10/865,707, filed Jun. 10, 2004 for "Two Cycle, Opposed Piston Internal Combustion Engine", published as US/2005/0274332 on Dec. 29, 2005, now U.S. Pat. No. 7,156,056, issued Jan. 2, 2007;

PCT application US2005/020553, filed Jun. 10, 2005 for "Improved Two Cycle, Opposed Piston Internal Combustion Engine", published as WO/2005/124124 on Dec. 15, 2005;

U.S. patent application Ser. No. 11/095,250, filed Mar. 31, 2005 for "Opposed Piston, Homogeneous Charge, Pilot Ignition Engine", published as US/2006/0219213 on Oct. 5, 2006, now U.S. Pat. No. 7,270,108, issued Sep. 18, 2007;

PCT application US/2006/011886, filed Mar. 30, 2006 for "Opposed Piston, Homogeneous Charge, Pilot Ignition Engine", published as WO/2006/105390 on Oct. 5, 2006;

U.S. patent application Ser. No. 11/097,909, filed Apr. 1, 2005 for "Common Rail Fuel Injection System With Accumulator Injectors", published as US/2006/0219220 on Oct. 5, 2006, now U.S. Pat. No. 7,334,570, issued Feb. 26, 2008;

PCT application US06/012353, filed Mar. 30, 2006 "Common Rail Fuel Injection System With Accumulator Injectors", published as WO/2006/107892 on Oct. 12, 2006;

U.S. patent application Ser. No. 11/378,959, filed Mar. 17, 2006 for "Opposed Piston Engine", published as US/2006/0157003 on Jul. 20, 2006, now U.S. Pat. No. 7,360,511, issued Apr. 22, 2008;

U.S. patent application Ser. No. 11/512,942, filed Aug. 29, 2006, for "Two Stroke, Opposed Piston Internal Combustion Engine", divisional of Ser. No. 10/865,707, now U.S. Pat. No. 7,546,819, issued Jun. 16, 2009;

U.S. patent application Ser. No. 11/629,136, filed Dec. 8, 2006, for "Improved Two Cycle, Opposed Piston Internal Combustion Engine", CIP of Ser. No. 10/865,707, now U.S. Pat. No. 7,549,401, issued Jun. 23, 2009;

U.S. patent application Ser. No. 11/642,140, filed Dec. 20, 2006, for "Two Cycle, Opposed Piston Internal Combustion Engine", continuation of Ser. No. 10/865,707;

U.S. patent application Ser. No. 12/075,374, filed Mar. 11, 2008, for "Opposed Piston Engine With Piston Compliance", continuation of Ser. No. 11/378,959, published as US/2008/0163848 on Jul. 10, 2008, now U.S. Pat. No. 7,591,235 issued Sep. 23, 2009;

U.S. patent application Ser. No. 12/075,557, filed Mar. 12, 2008, for "Internal Combustion Engine With Provision for Lubricating Pistons", continuation of Ser. No. 10/865,707, published as US/2008/0314688 on Dec. 25, 2008;

U.S. patent application Ser. No. 12/456,735, filed Jun. 22, 2009, for "Two Cycle, Opposed Piston Internal Combustion Engine", continuation of Ser. No. 11/629,136, published as US/2009/0293820 on Dec. 3, 2009;

U.S. patent application Ser. No. 12/584,086, filed Aug. 31, 2009, for "Opposed-Piston, Compression-Ignition Engine with Single-Side Mounted Crankshafts and Crossheads";

U.S. patent application Ser. No. 12/584,106, filed Aug. 31, 2009, for "Opposed-Piston, Compression-Ignition Engine with Single-Side Mounted Crankshafts and Crossheads";

U.S. patent application Ser. No. 12/592,030, filed Nov. 18, 2009, for "Low Tension Compression Seal";

U.S. patent application Ser. No. 12/655,538, filed Dec. 31, 2009, for "Generating Electricity with a Hypocycloidally-Driven Opposed Piston Engine";

U.S. patent application Ser. No. 12/658,695, filed Feb. 12, 2010, for "Cylinder and Piston Assemblies for Opposed-Piston Engines";

U.S. patent application Ser. No. 12/658,696, filed Feb. 12, 2010, for "Multi-Cylinder Opposed-Piston Engine Constructions";

U.S. patent application Ser. No. 12/658,697, filed Feb. 12, 2010, for "Opposed-Piston Engines with Controlled Provision of Lubricant";

PCT application PCT/US2010/000492, filed Feb. 19, 2010, for "Multi-Cylinder Opposed-Piston Engine Constructions;

U.S. patent application Ser. No. 12/799,077, filed May 28, 2010, for "Cylinder-Mounted Oil Wiper for An Opposed-Piston Engine".

BACKGROUND

The invention concerns an internal-combustion engine. More particularly, the invention concerns tailored cooling of the cylinder and pistons of an opposed piston engine.

The opposed piston engine was invented by Hugo Junkers around the end of the nineteenth century. Junkers' engine uses two pistons disposed crown-to-crown in a common cylinder having inlet and exhaust ports near bottom-dead-center of each piston, with the pistons serving as the valves for the ports. The engine has two crankshafts, one disposed at each end of the cylinder. The crankshafts, which rotate in the same direction, are linked by connecting rods to respective pistons. Wristpins within the pistons link the rods to the pistons. The crankshafts are geared together to control phasing of the ports and to provide engine output. In a typical Junkers engine, a supercharger is driven from the intake crankshaft, and its associated compressor is used to scavenge the cylinders and leave a fresh charge of air each revolution of the engine. Optionally, a turbo-supercharger may also be used. The advantages of Junkers' opposed piston engine over traditional two-cycle and four-cycle engines include superior scavenging, reduced parts count and increased reliability, high thermal efficiency, and high power density. In 1936, the Junkers Jumo airplane engines, the most successful diesel engines to that date, were able to achieve a power density that has not been matched by any diesel engine since. According to C. F. Taylor (*The Internal-Combustion Engine in Theory and Practice: Volume II revised edition*; MIT Press, Cambridge, Mass., 1985): "The now obsolete Junkers aircraft Diesel engine still holds the record for specific output of Diesel engines in actual service (Volume I, FIG. 13-11)."

Nevertheless, Junkers' basic design contains a number of deficiencies. The engine is tall and requires a long gear train to couple the outputs of the two crankshafts to an output drive. Each piston is connected to a crankshaft by a rod that extends from the piston. The connecting rods are massive to accommodate the high compressive forces between the pistons and crankshafts. These compressive forces, coupled with oscillatory motion of the wristpins and piston heating, cause early failure of the wristpins. The compressive force exerted on each piston by its connecting rod at an angle to the axis of the piston produces a radially-directed force (a side force) between the piston and cylinder bore. The friction generated by this side force is mitigated by a lubricant film between the cylinder and piston, but the film ruptures beyond a certain temperature and side force. Since the temperature of the cylinder/piston interface is principally determined by the heat of combustion, the breakdown temperature of the lubricant imposes a limit on the engine combustion temperature, which, in turn, limits the brake mean effective pressure (BMEP, an indicator of engine power) achievable by the engine. One crankshaft is connected only to exhaust-side pistons, and the other only to inlet-side pistons. In the Jumo engine the exhaust side pistons account for up to 70% of the torque, and the exhaust side crankshaft bears the heavier torque burden. The combination of the torque imbalance, the wide separation of the crankshafts, and the length of the gear train produces torsional resonance effects (vibration) in the gear train. A massive engine block is required to constrain the highly repulsive forces exerted by the pistons on the crankshafts during combustion, which literally try to blow the engine apart.

In an opposed piston engine described in Bird's U.K. Patent 558,115, counter-rotating crankshafts are located beside the cylinders such that their axes of rotation lie in a plane that intersects the cylinders and is normal to the axes of the cylinder bores. The side-mounted crankshafts are closer together than in the Jumo engines, thereby reducing the height of Bird's engine as compared with that of the Jumo engines. Bird's crankshafts are coupled by a shorter gear train that requires four gears, compared with five for the Jumo engine. The pistons and crankshafts in Bird's engine are connected by rods that extend from each piston along the sides of the cylinders, at acute angles to the sides of the cylinders, to each of the crankshafts. In this arrangement, the rods are mainly under tensile force, which removes the repulsive forces on the crankshafts and yields a substantial weight reduction because a less massive rod structure is required for a rod loaded with a mainly tensile force than for a rod under a mainly compressive load of the same magnitude. Bird's proposed engine has torsional balance brought by connecting each piston to both crankshafts. This torsional balance, the proximity of the crankshafts, and the reduced length of the gear train produce good torsional stability. To balance dynamic engine forces, each piston is connected by one set of rods to one crankshaft and by another set of rods to the other crankshaft. Piston load balancing substantially reduces the side forces that operate between the pistons and the internal bores of the cylinders. However, even with these improvements, traditional engine construction and conventional cooling prevent Bird's proposed engine from reaching its full potential for simplification and power-to-weight ratio ("PWR", which is measured in horsepower per pound, hp/lb).

Bird's engine uses an engine block in which cylinders, cylinder intake and exhaust manifolds, cylinder cooling jackets and engine bearings are cast in a large, heavy unit serving as the primary structural element of the engine. Thermal and mechanical stresses transmitted through the engine block and uneven heating during engine operation cause non-uniform cylindrical distortion of the cylinders. The piston crowns bear extremely high temperatures during combustion and become distent radially as a result. The cooling system of Bird's engine provides liquid coolant through the cylinder jackets in the engine block, but the system is not adapted to mitigate the non-uniform distortion of the cylinders or to prevent expansion of the piston crowns. As a consequence, close tolerances cannot be maintained between cylinders and pistons without a high risk of engine damage or early engine failure. Of course, without close tolerances, it is difficult to provide an effective seal between cylinders and pistons to limit blowby (the escape of gasses past the piston) during engine operation, without the use of piston rings. A rigid piston structure in which connecting rods are coupled with wrist pins mounted to piston skirts over-constrains the pistons during operation of the engine. This over-constraint prevents any part of a piston from repositioning with respect to the axis of an associated cylinder in response to an imbalance of forces coupled to the piston through the connecting rods.

A two-stroke, opposed-piston engine with side-mounted, counter-rotating crankshafts is described in PCT Patent Application PCT/US2005/020553. In this engine, the working elements (cylinders, pistons, linkages, crankshafts, etc.) are received upon a frame of passive structural elements fitted together to support the working elements. The frame bears the stresses and forces of engine operation, including compressive forces between the crankshafts. In contrast with the Junkers and Bird engines, the cylinders are not cast in an engine block, nor are they formed with other passive structural elements. Consequently, the cylinders are not passive structural elements of the engine. Thus, with the exception of combustion chamber forces, the cylinders are decoupled from the mechanical and thermal stresses of an engine block and are essentially only pressure vessels. Tailored application of liquid coolant to each cylinder of the engine compensates for asymmetrical heating of the cylinders, while the symmetrical application of liquid coolant to the interior surface of each piston crown maintains the shape of piston crowns during engine operation.

The engine described in PCT Patent Application PCT/US2005/020553 also includes a compliant member that allows for angular adjustment of piston structure with respect to the cylinder in response to an imbalance in forces coupled to the piston by the connecting rods. In this regard, an axially-centered tubular rod is mounted in the piston, and the connecting rods are linked to wrist pins attached to the rod. Piston compliance is realized in the innate flexibility of the tubular rod. Elimination of wrist pins from skirt mountings permits reduction of skirt mass and piston weight.

Further benefits to the engine described in PCT Patent Application PCT/US2005/020553 have resulted from additional embodiments of a compliant piston structure including a compliance boot acting between the piston crown and an axially-centered rod mounted in the piston. A single wristpin mounted on an axially-centered piston rod, externally to the piston, couples the piston with associated connecting rods that run between the piston rod and the crankshafts of the engine.

SUMMARY

In an opposed piston engine, a pair of pistons are disposed in opposition in the bore of a cylinder. The cylinder includes first liquid coolant grooves having a first cooling capacity to cool a portion of the cylinder extending from a central portion toward an exhaust port, and second liquid coolant grooves having a second cooling capacity, less than the first cooling capacity, to cool a portion of the cylinder extending from the central portion toward an inlet port.

Each piston includes a cylindrical skirt with a crown and an open end opposite the crown, a piston rod with a bore, a first end attached to a back surface of the crown, and a second end extending through the open end of the skirt, a radial array of liquid coolant flow passages in communication with the bore and disposed between the first end and the back surface of the crown, and a single wristpin retained on the second end section of the piston rod and positioned externally to the piston.

BRIEF DESCRIPTION OF THE DRAWINGS

The below-described drawings, which are not necessarily to scale, illustrate principles and examples discussed in the following detailed description.

FIGS. 1A-1D illustrate the structure of a cylinder used in an opposed piston internal-combustion engine

FIG. 3C is a side perspective view of the piston rod that attaches to the piston. FIG. 3D is an exploded assembly view of the piston, with the skirt removed, and with the piston rod and wristpin associated therewith.

FIGS. 5A-5E are perspective views of a multiple-cylinder implementation of the opposed piston engine showing assembly details at various stages of assembly.

FIGS. 8A-8F illustrate applications of the opposed piston engine.

DETAILED DESCRIPTION

FIGS. 1A-1D illustrate a cylinder 1100 useable in an opposed piston internal-combustion engine. The cylinder 1100 has four parts: a cylinder liner 1102 formed as an open cylindrical tube with a cylindrical bore 1103, an exhaust manifold 1104, an inlet manifold 1106, and a cylinder sleeve 1140. Preferably, the cylinder 1100 is made from aluminum, such as a high-temperature aluminum alloy, and it may be cast or assembled by fixing the manifolds 1104 and 1106 to the cylinder sleeve 1140 and then fixing that subassembly to the outer surface of the cylinder liner 1102. The longitudinal axis $A_c$ of the cylinder liner 1102 is also the longitudinal axis of the cylinder 1100.

Figure 1A:
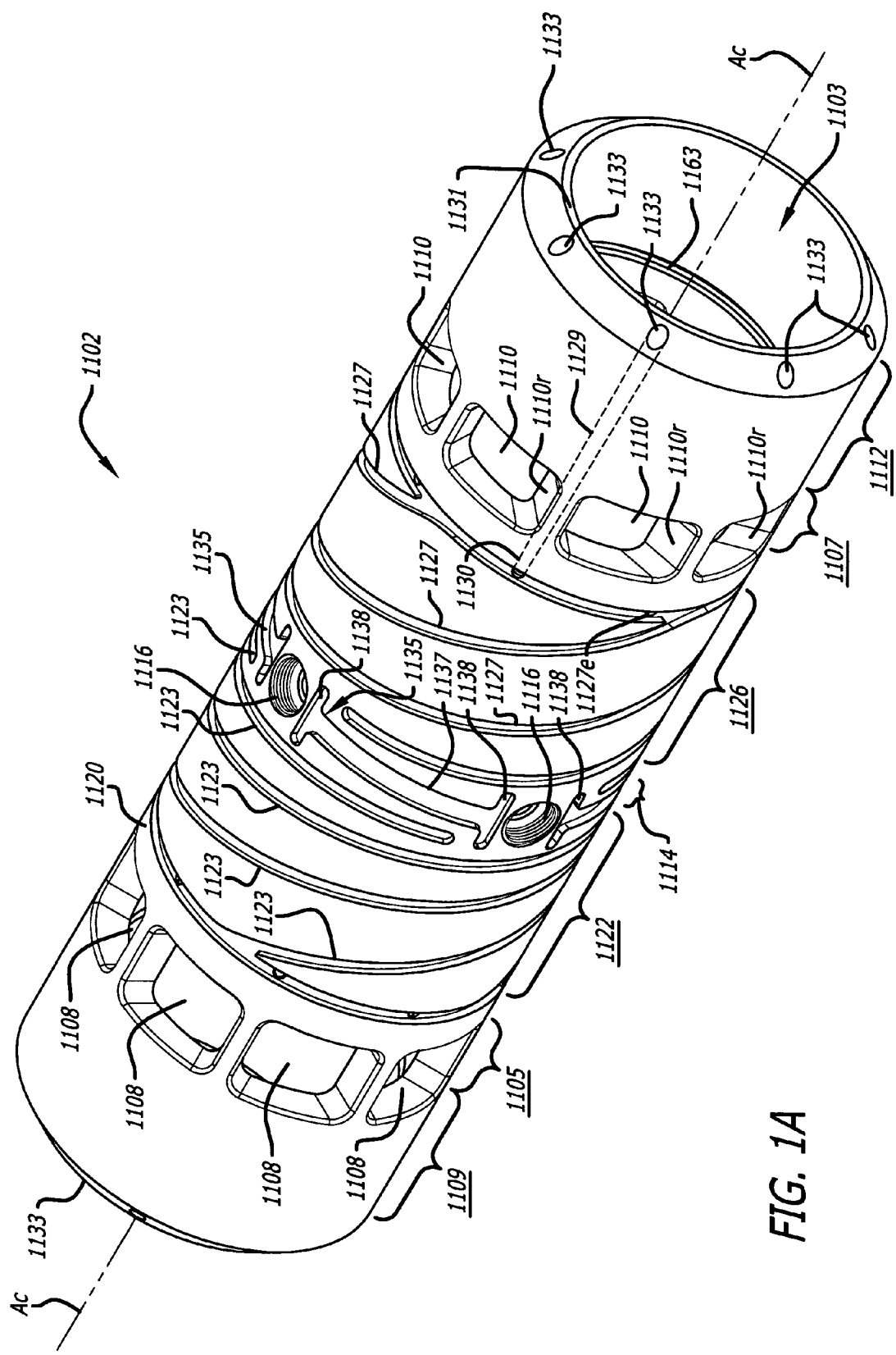

As best seen in FIG. 1A, the cylinder liner 1102 has an exhaust port 1105 constituted of a series of circumferentially-spaced openings 1108 near an exhaust end 1109 of the cylinder liner 1102. The cylinder liner 1102 also has an inlet port 1107 constituted of a series of circumferentially-spaced openings 1110 near an inlet end 1112. Combustion gases spiraling toward the exhaust end 1109 of the cylinder liner 1102 are diverted at least generally out of the cylinder liner 1102 into the exhaust manifold 1104 shown in FIG. 1C. Each opening 1110 of the inlet port 1107 has a ramped upstream end 1110r at which pressurized air flowing into the inlet port 1107 through the inlet manifold 1106 is diverted into the bore 1103 in a spiral direction toward the exhaust end 1109. At a central portion 1114 of the cylinder liner 1102, a number of threaded openings 1116 are provided in a circumferential sequence. At least one of the openings 1116 receives a fuel injector, and at least one other of the openings 1116 receives a sensor for sensing engine operating conditions such as pressure or temperature. In the cylinder liner 1102 shown, there may be, for example, two openings 1116 for receiving fuel injectors, one opening 1116 for receiving a pressure sensor, and one opening 1116 for receiving a temperature sensor.

Figure 2:
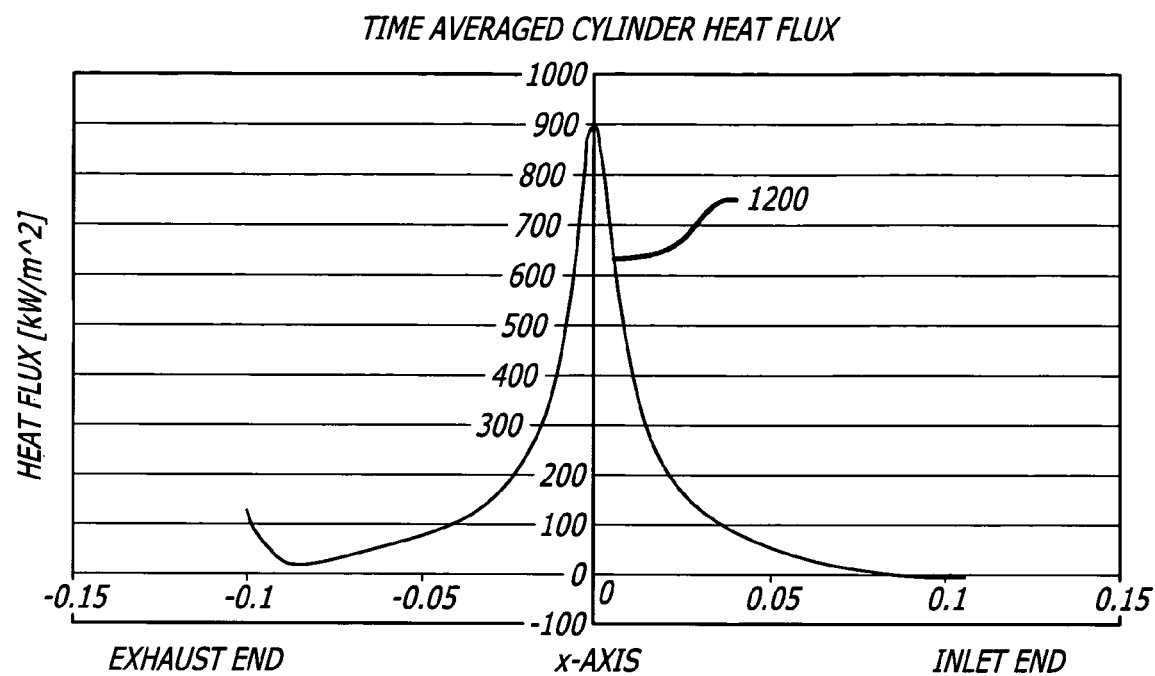
FIG. 2 is a curve illustrating time-averaged cylinder heat flux measured in an axial direction during operation of an opposed piston engine.

The curve 1200 of FIG. 2 illustrates average heat flux measured across a longitudinal trace on the inside wall of a cylinder having a construction like that of the cylinder 1100 during engine operation. As the curve 1200 shows, the cylinder liner is non-uniformly heated with respect to its longitudinal axis. The cylinder liner has its greatest heat load in its central portion, where combustion occurs. Also, the end portion of the cylinder liner with the exhaust port experiences a greater heat load than the end portion with the inlet port. Thus, in order to minimize non-uniformities in the temperature of the cylinder and resulting cylindrical non-uniformity of the cylinder bore, the cylinder is cooled in a tailored manner that accommodates the non-uniform ways its portions are heated during engine operation. That is to say, a system for cooling a cylinder such as the cylinder 1100 provides a greater cooling capacity to the portion of the cylinder from near its axial center to the exhaust end than the portion from near its axial center to the inlet end, and provides the highest cooling capacity to the central portion of the cylinder.

With reference to FIG. 1A, there also exists a potential for a circumferential temperature variation in the cylinder wall even with uniform heat flux if the available cooling is not uniform around the circumference. Non-uniform cooling also occurs in the central portion 1114 due to the sequence of openings 1116. To maintain circumferential temperature uniformity, and thus cylindrical uniformity, in the central portion 1114, the cooling adjacent to these openings 1116 subsumes the cooling that would have occurred had the openings not been present.

Figure 1B:
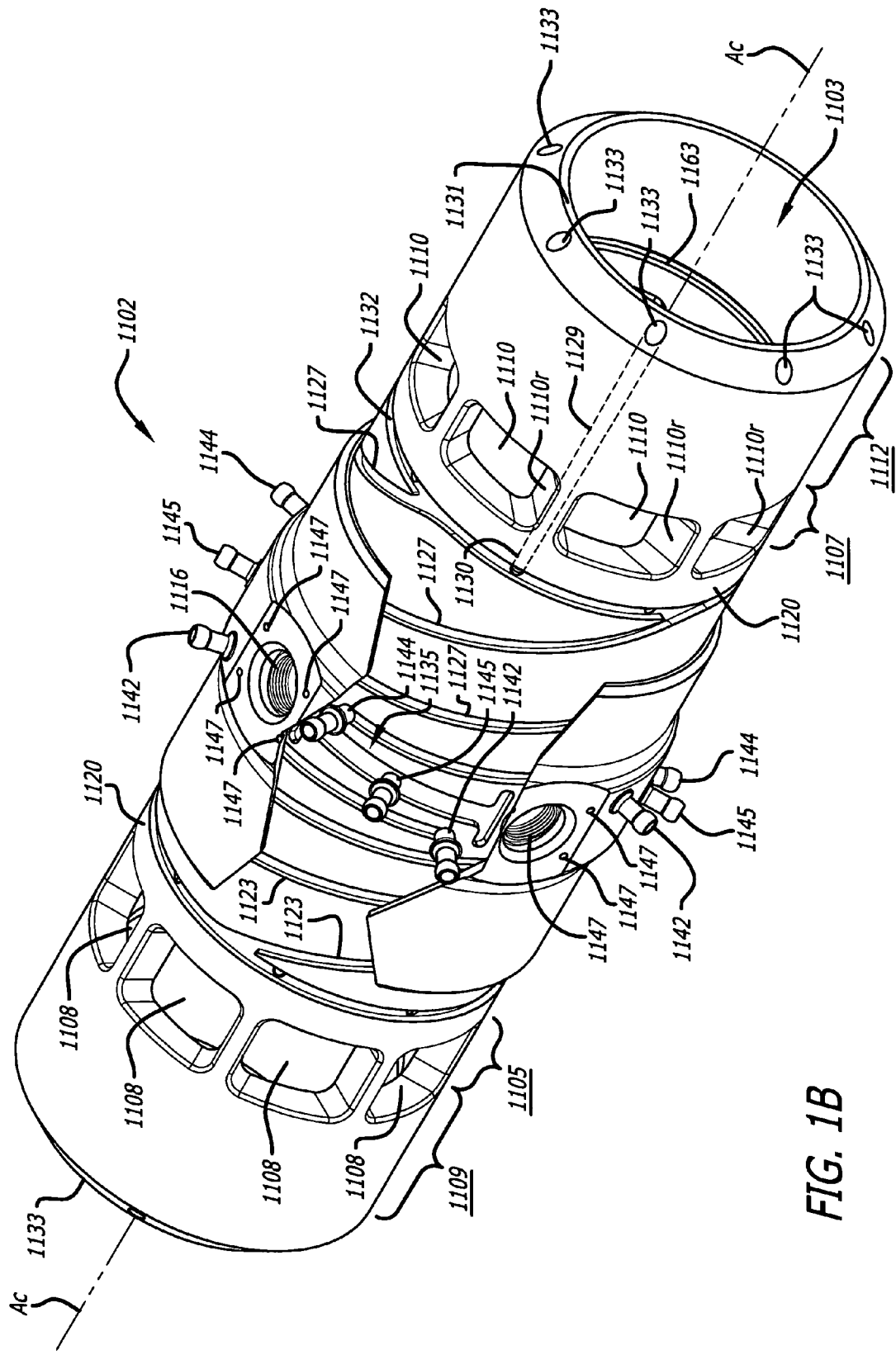
Figure 1D:
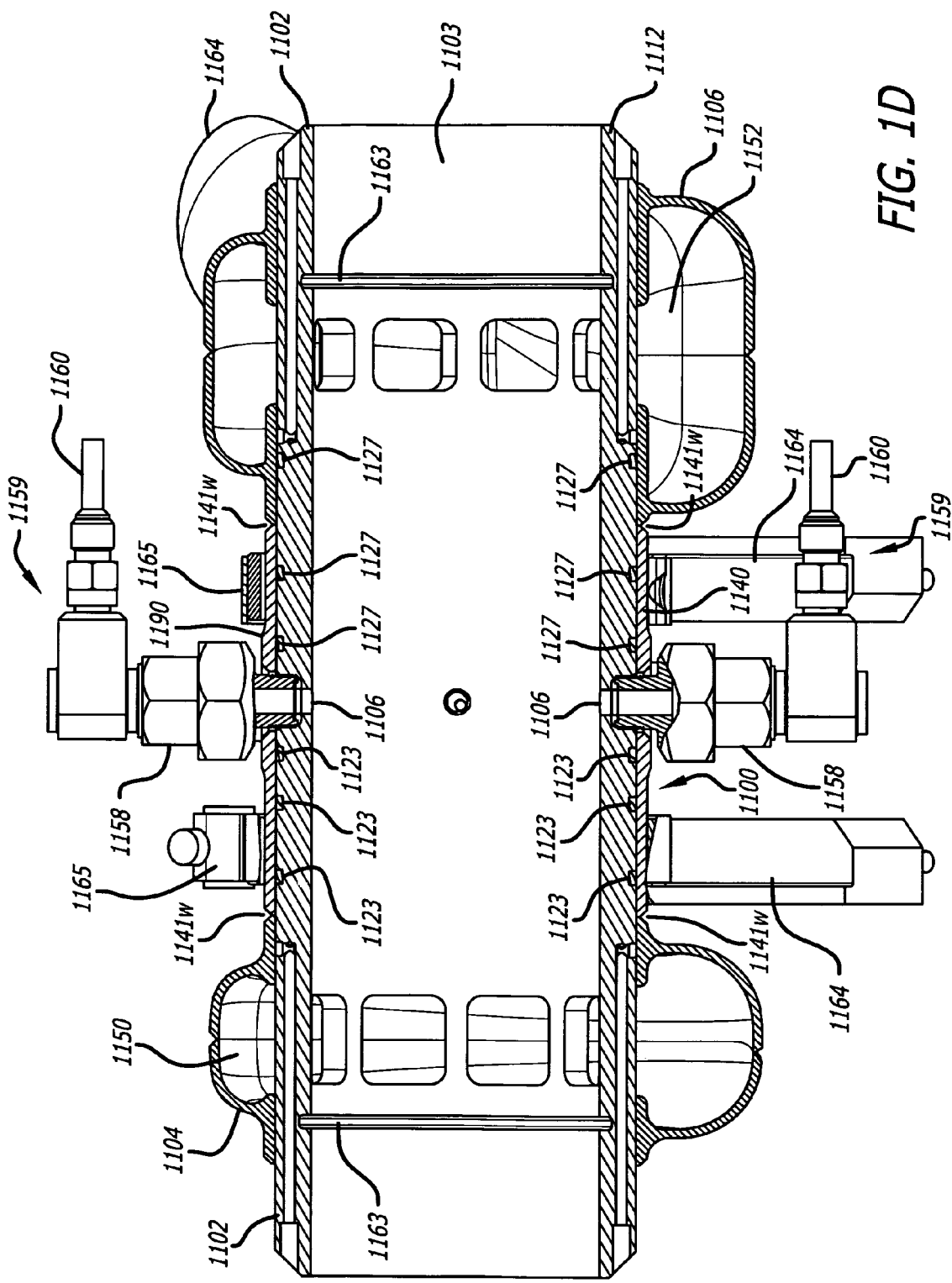

To provide a tailored cooling capacity that meets these goals, a number of grooves or channels are provided on the outside surface 1120 of the cylinder liner 1102. Referring to FIGS. 1A, 1B, and 1D, a first group 1122 of interlaced grooves 1123 spiral around the outside surface 1120 from the central portion 1114 toward the exhaust port 1105, and a second group 1126 of interlaced grooves 1127 spiral around the outside surface 1120 from the central portion 1114 toward the inlet port 1107. Each groove of these two groups originates in or near the central portion 1114, follows a spiral path around the outside surface 1120, and terminates near a respective port 1105, 1107 in a drilled radial section. The drilled radial section of each groove communicates with a drilled axial channel extending longitudinally within the cylinder liner 1102 through an edge of the cylinder liner 1102. One such axial channel, indicated by reference numeral 1129 in FIG. 1A, communicates through a drilled radial section 1130 with an end 1127e of a groove 1127 and penetrates the edge 1131 through a hole 1133. This enables a stream of liquid coolant to flow from the beginning of a groove in or near the central portion 1144, along the spiral of the groove toward a respective end of the cylinder liner 1102, through a channel in the cylinder liner, and out of a hole in an edge of the cylinder liner 1102. Each group 1122, 1126 of grooves conducts an aggregate flow of liquid coolant from the central portion 1114 to an end portion of the cylinder liner 1102, enabling cooling of the respective corresponding portion of the cylinder liner, and thereby, of the cylinder 1100 itself. There is a pitch, or spacing, (which may be constant or varying) between the grooves of each group and the pitch for the grooves of the group 1122 extending from the central portion 1114 toward the exhaust end 1109 is less than the pitch for the group 1126 of grooves extending from the central portion 1114 toward the inlet end 1112. As a result, more liquid coolant contacts the cylinder liner portion over a larger surface area including the exhaust port 1105 than the cylinder liner portion including the inlet port 1107, thereby providing greater cooling capacity for the cylinder liner portion that includes the exhaust port 1105. The coolant is also the coolest, and therefore has the greatest heat exchange capacity, as it enters the grooves near the central portion 1114 of the cylinder liner 1102 where the cooling requirements are the greatest. Furthermore, the grooves may have a variable cross-sectional area along their length that affects the local flow velocity of the coolant within the grooves and therefore the local rate of heat removal. Thus, the cooling capacity of the spiral grooves is settable over a wide range by varying any or all of the number of interlaced grooves, the length of the grooves, the pitch of the grooves, the cross-sectional area along the length of the grooves and the coolant flow rate into the channels.

Still referring to FIGS. 1A, 1B, and 1D, a third group of grooves 1135 extend around the outside surface 1120 in the central portion 1114 of the cylinder liner 1102, with each groove 1135 extending between two of the openings 1116 in the central portion. Each groove 1135 has an elongated portion 1137 that extends in an arc on the circumference of the cylinder liner 1102, and cross portions 1138 at the opposed ends of the elongated portion 1137. Each cross portion 1138 is transverse to the elongate portion 1137 so that each of the grooves 1135 has the shape of an I. As best seen in FIG. 1A, each cross portion 1138 is positioned immediately adjacent an opening 1116. In operation, liquid coolant introduced into each groove 1135 at the center of its elongate portion 1137 flows through the elongate portion 1137 toward each cross portion 1138 and then is exhausted from holes 1147 (best seen in FIG. 1B) in the cylinder sleeve 1140 at either end of each cross portion 1138. Thus, liquid coolant flowing in each groove 1135 has an extended flow path at each end 1138 of the groove, near an opening 1116. Consequently, each groove 1135 provides an enhanced capacity for cooling at the hottest parts of the central portion 1114, near the openings 1116. The cooling capacity provided for the central portion 1114 varies with the circumferential distance to the nearest opening 1116 in the central portion. The cooling in the grooves 1135 is a very effective, localized method for removing heat from the area of the openings 1116 that is not accessible to cooling by the group of spiral grooves 1122, 1126. The effectiveness of heat removal in the central section 1114 is due to a stagnation flow pattern of the coolant occurring in the zone where the coolant flows to and touches the center of each end 1138 before flowing to the tips of the end.

Assembly details of the cylinder 1100 are seen in FIGS. 1B-1D. The tubular cylinder sleeve 1140 is received on the surface 1120 of the cylinder liner 1102, centered on the central portion 1114 and extending to and meeting the exhaust and inlet manifolds 1104 and 1106. The manifolds 1104, 1106 may be welded to the cylinder sleeve 1140 at the seams 1141 between the cylinder sleeve and the exhaust and inlet manifolds 1104 and 1106. Such welds 1141w are best seen in FIG. 1D. Alternatively, the manifolds 1104 and 1106 may be individually cast with respective portions of the cylinder sleeve 1140 and fixed to each other and to the cylinder liner 1102 by welding. Together, the exhaust and inlet manifolds 1104 and 1106 and the cylinder sleeve 1140 cover the grooves 1123, 1127, and 1135, confining the flow of liquid coolant in the grooves. As best seen in FIG. 1B, the cylinder sleeve 1140 includes pipes 1142, 1144, and 1145. Each pipe 1142 is positioned over the beginning of a respective groove 1123 near the central portion 1114; each pipe 1144 is positioned over the beginning of a respective groove 1127 near the central portion 1114; and each pipe 1145 is positioned over the center of the elongate portion 1137 of a respective groove 1135. Liquid coolant flows into grooves 1123 and 1127 through pipes 1142 and 1144, near or at the central portion 1114 of the cylinder liner 1102, and flows in streams through the grooves and the drilled channels 1129, and out of the holes 1133 in the end edges 1131 of the cylinder liner 1102. Liquid coolant flows into the grooves 1135 through pipes 1145, and flows in streams through the elongate portions 1137, to the ends 1138. Holes 1147 provided through the cylinder sleeve 1140 are positioned at the tips of the ends 1138 to permit liquid coolant to flow out of the grooves 1135. As best seen in FIG. 1C, the pipes 1142, 1144 and 1145 receive couplings 1148 mounted on liquid coolant supply lines 1149 that connect to a liquid coolant supply system as explained below. Three liquid coolant supply circuits may be provided in a liquid coolant supply system to supply liquid coolant for the three groups of grooves. Each circuit is connected to a respective group of grooves by way of the pipes that communicate with the grooves to input liquid coolant at a desired pressure and flow rate for the group of grooves. In these figures, no lines are provided to conduct liquid coolant flowing out of the grooves on the outside surface 1120 of the cylinder liner 1102. The liquid coolant may be collected by a sump in the engine. In this case, the liquid coolant is expelled through the holes 1133 at each end edge 1131 of the cylinder liner 1302. Some portion of the liquid coolant will fall from the holes 1133 onto the outside skirt surfaces of the opposed pistons (not shown in FIGS. 1A-1D) as they reciprocate in the bore 1103, thereby cooling and lubricating those surfaces during engine operation. Alternatively, the liquid coolant flowing out of the ends of grooves on the cylinder 1100 may be conducted in liquid coolant return lines connected by conventional fittings to the holes 1133 and 1147 for collection and recirculation of the liquid coolant as explained below.

As seen in FIGS. 1C and 1D, the exhaust and inlet manifolds 1104 and 1106 have respective internal annular volutes 1150 and 1152 that communicate with the exhaust and inlet ports 1105 and 1107, respectively. Preferably each of the volutes 1150 and 1152 has the shape of a scroll in order to induce swirling of gasses flowing therethrough, while controlling turbulent mixing. Swirling the pressurized air facilitates scavenging and enhances combustion efficiency. Ducts 1153 and 1154 connect the exhaust and inlet manifolds 1104 and 1106 to a system for discharging exhaust gasses from and providing charge air to an opposed piston engine as described below.

As seen in FIGS. 1B-1D, the cylinder sleeve 1140 includes one or more openings 1156, each aligned with a corresponding threaded opening 1116 in the cylinder liner 1102. One or more fuel injectors 1158, each threaded at its nozzle end, are mounted to the cylinder 1100 by being threaded into openings 1116. Each fuel injector 1158 is coupled at 1159 to a high-pressure fuel line 1160 and may be provided with fuel by a system as described below.

An annular groove is provided near each end of the cylinder liner 1102, in the bore 1103, for seating an O-ring. One such O-ring 1163 is visible through the inlet end 1112 in FIGS. 1A and 1B, and both O-rings are visible in FIG. 1D. The O-rings 1163 are provided to contact and wipe excess lubricant from the exterior surfaces of the skirts of opposed pistons (not seen in these figures) that move in the bore 1103. The O-rings are preferably made of a resilient fluoro-elastomer material.

With reference to FIGS. 1C and 1D, the cylinder 1100 is provided with mounting brackets 1164 mounted to the outside surface of the cylinder sleeve 1140 that are received in a frame (not shown in these figures) when the cylinder 1100 is assembled into an opposed piston engine. The mounting brackets 1164 are shown mounted to the external surface of the cylinder sleeve 1140 by adjustable constricting clamps 1165, although this is not meant to be limiting. The mounting brackets 1164 may be welded to the cylinder sleeve 1140, or may be individually cast with respective portions of the cylinder sleeve 1140, which are fixed to each other and to the cylinder liner 1102 by welding.

Figure 3A:
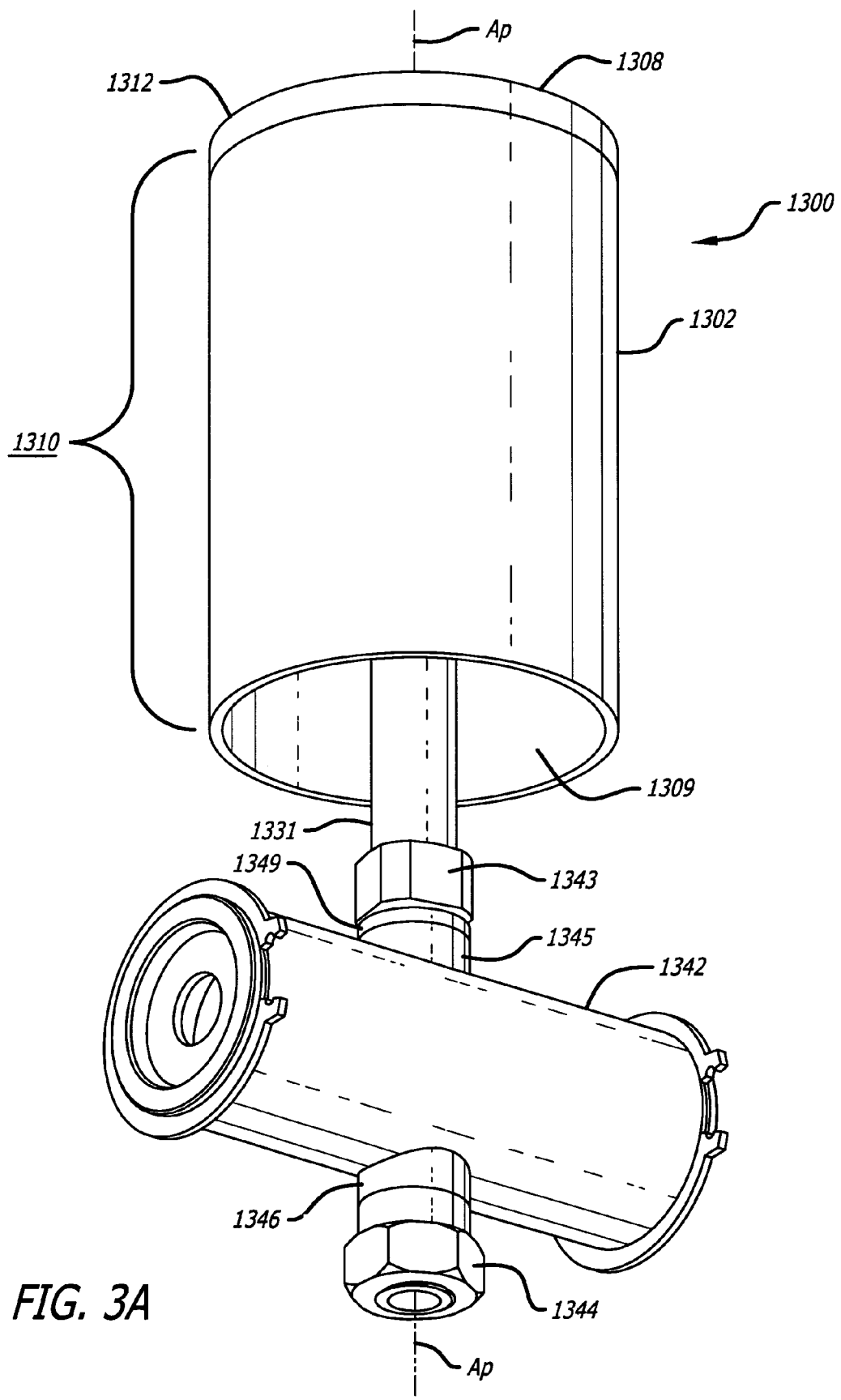
FIG. 3A is a side perspective view of a piston and a piston rod with an attached wristpin.
Figures 3B, 3F:
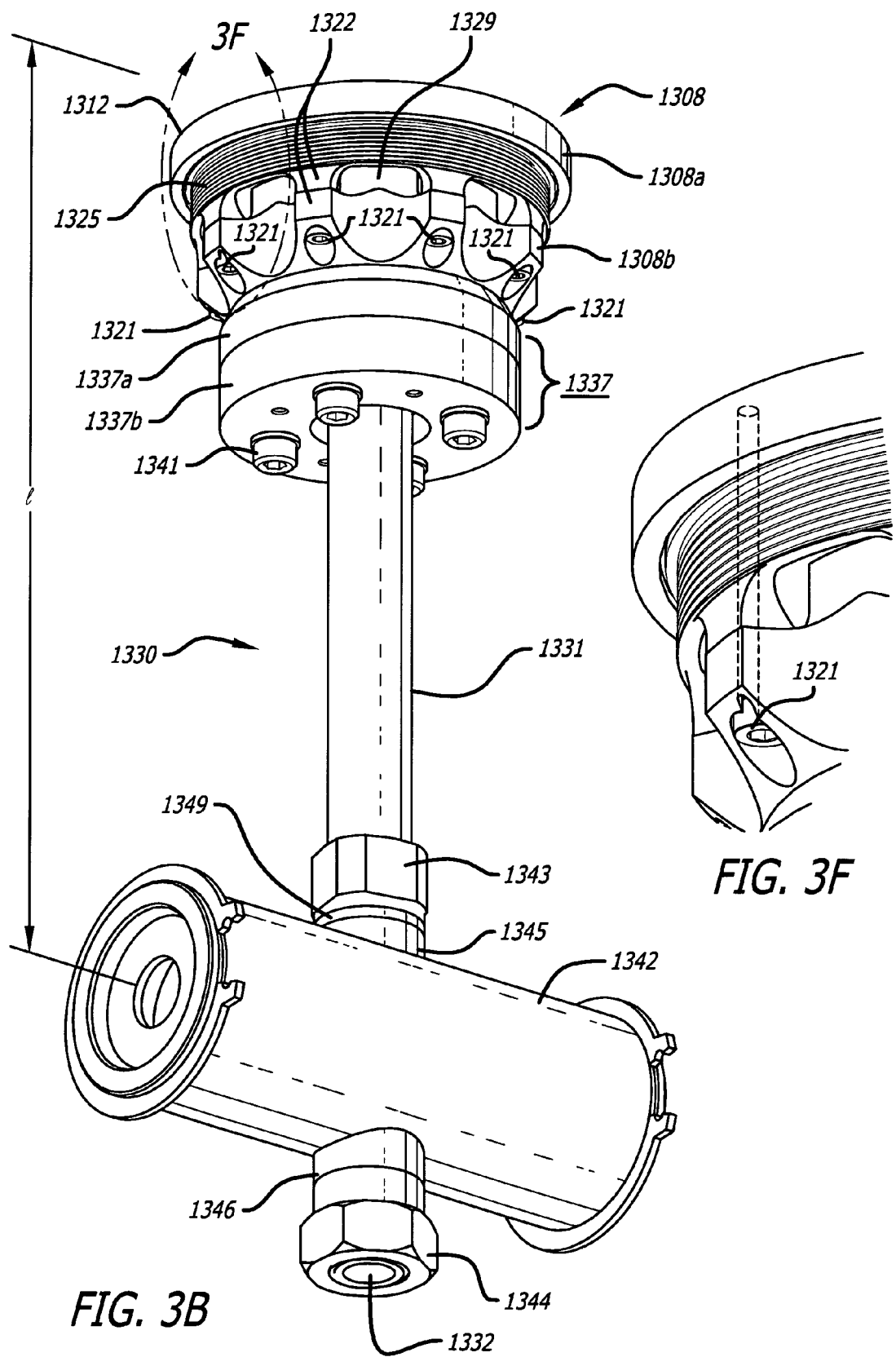
FIG. 3B is a side perspective view of the piston, with the skirt removed, and with the piston rod and wristpin attached thereto.
FIG. 3F is a magnified view of a portion of the piston crown showing an assembly detail.

FIGS. 3A through 3E illustrate a piston 1300 useable in an opposed piston internal-combustion engine. The piston 1300 is preferably ringless, although this is not intended to exclude the use of piston rings on the piston 1300, if required. Referring to FIGS. 3A and 3B, the piston 1300 includes a cylindrical section 1302 with piston crown 1308 at one end. The cylindrical section 1302 has an open end 1309 opposite the crown 1308. The portion of the cylindrical section 1302 extending from the crown 1308 to the open end 1309 forms the piston skirt 1310. The longitudinal axis $A_p$ of the cylindrical section 1302 is also the longitudinal axis of the piston 1300. A piston rod 1330, preferably a tubular rod, shown in FIG. 3C, is attached to the piston 1300. The piston rod 1330 includes a shaft 1332, a central bore 1332, a disc-shaped end section 1334, and a threaded end section 1335. Manifestly, the piston rod 1330 has a cylindrical cross-sectional shape. This is not intended to limit the construction of the piston rod, when other cross-sectional shapes may be used.

With reference to the view of the piston 1300 (with the skirt 1310 removed) illustrated in FIG. 3B, the crown 1308 is formed on a crown piece 1308a. A crown backing piece 1308b, complementary to the crown piece 1308a, is joined to the crown piece 1308a by screws 1321. Together, the crown pieces 1308a and 1308b form ribs 1322. The ribs 1322 serve as load-bearing elements and define coolant flow passages 1329 therebetween for piston cooling, described later. Preferably, the ribs 1322 and the flow passages 1329 are evenly spaced circumferentially about the longitudinal axis $A_p$. Preferably, the ribs, and therefore the passages, exhibit rotational symmetry around the longitudinal axis $A_p$, and impart such symmetry to the internal portion of the piston, under the crown 1308. The ribs 1322 extend radially toward the inner surface of the piston skirt 1310, abut the back surface of the crown 1308, and also extend longitudinally within the piston 1300 from a back surface of the crown toward the open end 1309. The ribs 1322 transfer the axial loads exerted on the crown 1308 during engine operation to other elements of the piston 1300. The precise shape, extent, and number, of ribs 1322 may vary, for example, according to engine design and operating specifications. Preferably, the crown pieces 1308a and 1308b constitute a single crown unit, with the skirt 1310 formed as a single cylindrical unit and joined to the crown unit. The crown unit and skirt may be assembled from machined parts or made by casting and/or machining high-temperature aluminum, steel alloy, or iron, and then joined by brazing, welding or threading. In this example, the skirt 1310 is threaded to the crown 1308 at 1325 as best seen in FIG. 3B.

With further reference to FIGS. 3A and 3B, a single wrist-pin 1342, external to the piston 1300, is retained on the threaded end section 1335 of the piston rod 1330 by a stop 1343 and a bored threaded nut 1344, between spacers 1345 and 1346. If desired for increased precision of the spacing between the crown 1308 and the rotational axis of the wristpin 1342, a machined shim 1349 may be provided between the spacer 1345 and the stop 1343.

Benefits are realized by allowing the structure supporting the piston 1300 to deform elastically in some manner during engine operation for the purpose of regaining and/or maintaining axial alignment between the piston 1300 and the cylinder as the piston reciprocates in the bore of the cylinder. Such deformation may be referred to as "compliance". Compliance is provided by retaining the disc-shaped end section 1334 of the piston rod 1330 in a compliance boot 1336 that permits limited movement between the disc-shaped end 1334 of the piston rod 1330 and the crown 1308 by resiliently deforming in response to off-axial force acting on the piston rod 1330.

FIG. 3D is an exploded view of the piston 1300 depicting further details of elements of the piston and an assembly sequence thereof. As seen in FIG. 3D, the crown backing piece 1308b includes a central annulus with a bore 1328 to be centered on the longitudinal axis $A_p$, behind the crown 1308. The crown backing piece 1308b is secured to the crown piece 1308a by two screws 1321 extending through each rib 1322. The disc-shaped end section 1334 of the piston rod 1330 is retained in a compliance boot 1336 constituted of a resilient material, for example a fluoro-elastomer material. The compliance boot 1336 is itself contained in the compliance container 1337. The compliance container 1337 is a cylindrical enclosure assembled from a first piece 1337a and a second piece 1337b. Threaded screws 1341 join the first and second pieces 1337a and 1337b. The compliance boot 1336 may be constituted of a single molded piece, or it may be assembled from molded parts. Preferably, although without limitation, the compliance boot 1336 is assembled around the disc-shaped end section 1334 of the piston rod 1330 using two flat fluoro-elastomeric discs 1338 and 1339 and a fluoro-elastomeric ring 1340. The disc 1338 is positioned between the first piece 1337a and the disc-shaped end section 1334; the ring 1340 is received around the perimeter of the disc-shaped end section 1334; and the disc 1339 is positioned between the disc-shaped end section 1334 and the second piece 1337b. The disc 1338 has a central opening 1338o and four through holes 1338t. The opening 1338o and the through holes 1338t may be lined with thin metal (preferably brass) backing rings. The disc 1339 has a central opening 1339o and four through holes 1339t. The opening 1339o is large enough to clear the stop 1343 so that the disc 1339 may be received over the shaft 1332 of the piston rod 1330. The opening 1339o and the through holes 1339t may be lined with thin metal (preferably brass) backing rings. The backing rings of the through holes 1338t, 1339t are not shown; the backing rings 1338ob, 1339ob for the openings 1338o, 13389o are seen in FIG. 3E.

Figure 3E:
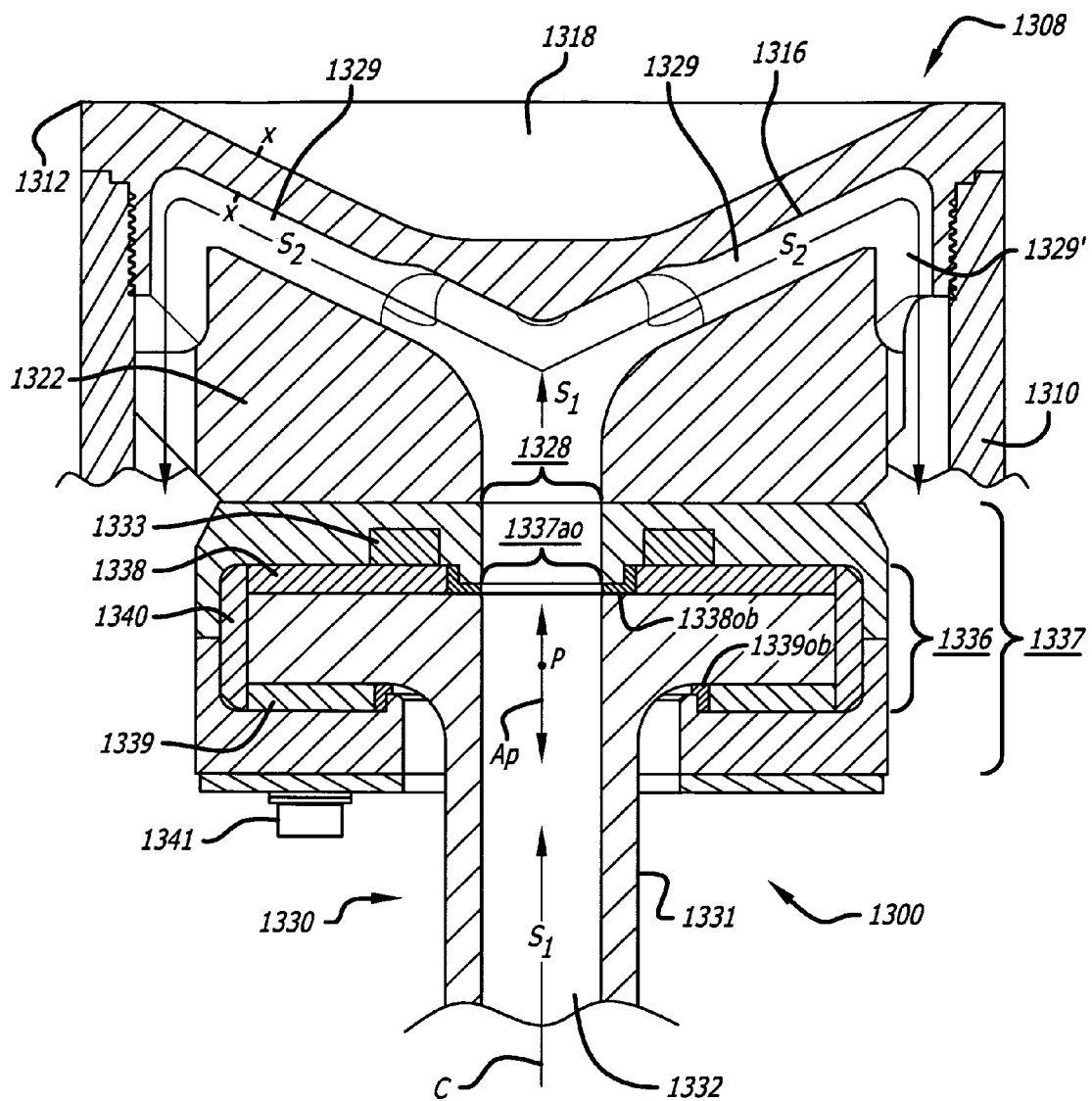
FIG. 3E is an enlarged side sectional view of an upper portion of the piston with the skirt partially cut away.

With further reference to FIGS. 3D and 3E, the first piece 1337*a* of the compliance container has a lipped central opening 1337*ao*, and the second piece 1337*b* has a lipped central opening 1337*bo*. The opening 1337*bo* is large enough to clear the stop 1343 so that the second piece 1337*b* may be received over the shaft 1331 of the piston rod 1330. The compliance container 1337 encloses and retains the compliance boot 1336, with the disc-shaped end section 1334 of the piston rod retained within the boot. A metal disc 1348 with a central opening 1348*o* and through holes 1348*t* is disposed in the compliance container 1337 between the disc 1338 and the piece 1337*a*. Before the compliance container 1337 is assembled, the first piece 1337*a* is secured to the bottom of the crown backing piece 1308*b* by threaded screws 1333 that extend through through holes 1337*ai* in the first piece 1337*a* and that are retained in corresponding threaded holes (not seen) in the crown backing piece 1308*b*. The compliance container 1337 is then assembled around the compliance boot 1336 by provision of elongate threaded screws 1341 that extend through through holes 1337*bt*, 1339*t*, 1334*t*, 1338*t*, and 1348*t*, and are retained in threaded through holes 1337 at.

Deformation of the compliance boot 1336 is contained by the compliance container 1337, the disc 1348, and the backing rings in the discs 1338 and 1339. The diameters of the through holes 1338*t* and 1339*t*, with backing rings, are slightly larger than the diameter of the screws 1341 in order to provide space within which the compliance boot 1336 may resiliently deform. Preferably, although without limitation, the compliance boot 1336 allows pivotal movement of the piston rod 1330 with respect to a pivot point P on the axis Ap.

With reference again to FIG. 3D, the wristpin 1342 has a clearance hole 1347 so that the wristpin can be received on the threaded end 1335 of the piston rod 1330, and mounted thereto to be external to the piston 1300. Once the crown pieces 1308*a* and 1308*b*, the compliance boot 1336 and the compliance container 1337 have been assembled, the shim 1349 (if used) and the spacer 1345 are received on the threaded end 1335 of the piston rod 1330, against the stop 1343, followed by the wristpin 1342, the spacer 1346, and the threaded nut 1344. Although not shown in FIG. 3D, one of three connecting rods is received on the wristpin 1342 prior to mounting the wristpin to the threaded end 1335. This arrangement may be understood with reference to FIG. 4B, where a centrally-mounted connecting rod 1447*a* with a forked end 1447*aw* having two laterally-spaced engaging arms with aligned openings is slidably received on the wristpin 1342. The forked end 1447*aw* is positioned on the wristpin 1342 such that the clearance hole 1347, threaded end 1335, and threaded nut 1344 are centered between the engaging arms of the forked end 1447*aw*.

Referring to FIG. 3E, it may be desirable that the piston 1300 be cooled to alleviate thermally-induced distortion during engine operation. Distortion of the piston results from thermal expansion, compression pressure, combustion pressure, inertial forces and blowby pressure. The greatest risk of thermal distortion occurs at the crown 1308, especially adjacent to and at the corner 1312. Without cooling, this portion of the piston 1300 may bulge during engine operation, giving the piston 1300 a mushroom or tulip shape and raising the risk of contact between the piston and the cylinder bore, if not controlled. The distortion may be eliminated, or at least substantially reduced, by maintaining as thin a cross section x-x (see FIG. 3E) as possible in the crown 1308 in order to minimize the thermal impedance where maximum heating occurs, while cooling the crown by application of one or more streams of liquid coolant on the back surface 1316 of the crown. Since the distortion is substantially uniform, such cooling may be tailored to the substantially symmetric heat distribution in and adjacent the crown 1308.

Referring again to FIGS. 3B and 3E, the application of liquid coolant to the back surface 1316 of the crown 1308 may be understood. The bore 1328 in the crown backing piece 1308*b* transitions to the radially-distributed flow passages 1329. Each flow passage 1329 is positioned between a respective pair of ribs 1322 and is axially inclined so as to transition from the bore 1328 at a slant along the back surface 1316 of the crown 1308. Each flow passage 1329 extends toward the edge 1312 of the crown 1308. Near the edge 1312 of the crown 1308, each flow passage 1329 transitions in a sharp reverse curve 1329' to be directed toward the open end of the piston 1300. The bore 1328 of the piston rod 1330 constitutes a channel to deliver a stream of a liquid coolant to the crown 1308 by way of the flow passages 1329. The bore 1332 of the piston rod 1330 communicates through the opening 1337*ao* in the compliance container 1337 and the bore 1328 in the crown backing piece 1308*b* with the flow passages 1329. A stream S1 of liquid coolant C introduced through the bore in the threaded nut 1344 received on the threaded end of the piston rod 1330 flows in a first direction along the axis of the piston 1300, through the bores 1332 and 1328. The stream S1 impinges on the back surface 1316, aligned with the center of the crown, and fans out into streams S2 that pass through the flow passages 1329, flowing in an inclined axial direction along the back surface 1316 of the crown 1308 toward the edge 1312. Near the edge 1312 of the crown, the liquid coolant C flows out of the crown, along the skirt 1310 toward the open end 1309. The viscosity and velocity of the coolant C and the number and dimensions of the flow passages 1329 may be varied to assure turbulence of the streams in the local flow of the coolant within the flow passages 1329 and along the back surface 1316. As is known, turbulence enhances the capacity of the coolant to conduct heat away from the back surface 1316 and the sides of the flow passages 1329. The flow rate of the coolant C is raised to a level to assure a high rate of heat removal from the crown 1308. Thus, the cooling capacity of the flow passages 1329 is settable over a wide range by varying any or all of the number of passages, the dimensions of the passages, the axial orientation of the passages, and the viscosity and flow rate of the coolant C into the piston 1300. Preferably, the coolant C flows out of the open end 1309 of the piston 1300 to be collected with liquid coolant flowing out of the cylinder 1100 by a sump.

Thus, rotationally symmetrical delivery of streams of liquid coolant directed at the back surface 1316 of the crown 1308 assures uniform cooling of the crown during engine operation and eliminates, or substantially reduces, swelling of the crown and the portion of the skirt immediately adjacent the crown during engine operation. The shape of the piston 1300 is thereby substantially maintained, even at high BMEP. According to an exemplary piston design utilizing such streams to control thermal distortion, the differential expansion of the crown relative to the lower cylindrical portion of a 3.15 inches (8.0 cm) diameter piston can be maintained at less than 0.001 inch (0.025 mm). With effective cooling of the crown 1308, it becomes less important to transfer heat through the piston skirt 1310. As a result, the skirt 1310 may be made thinner than otherwise would be necessary, thereby lowering the mass of the piston.

Figure 4A:
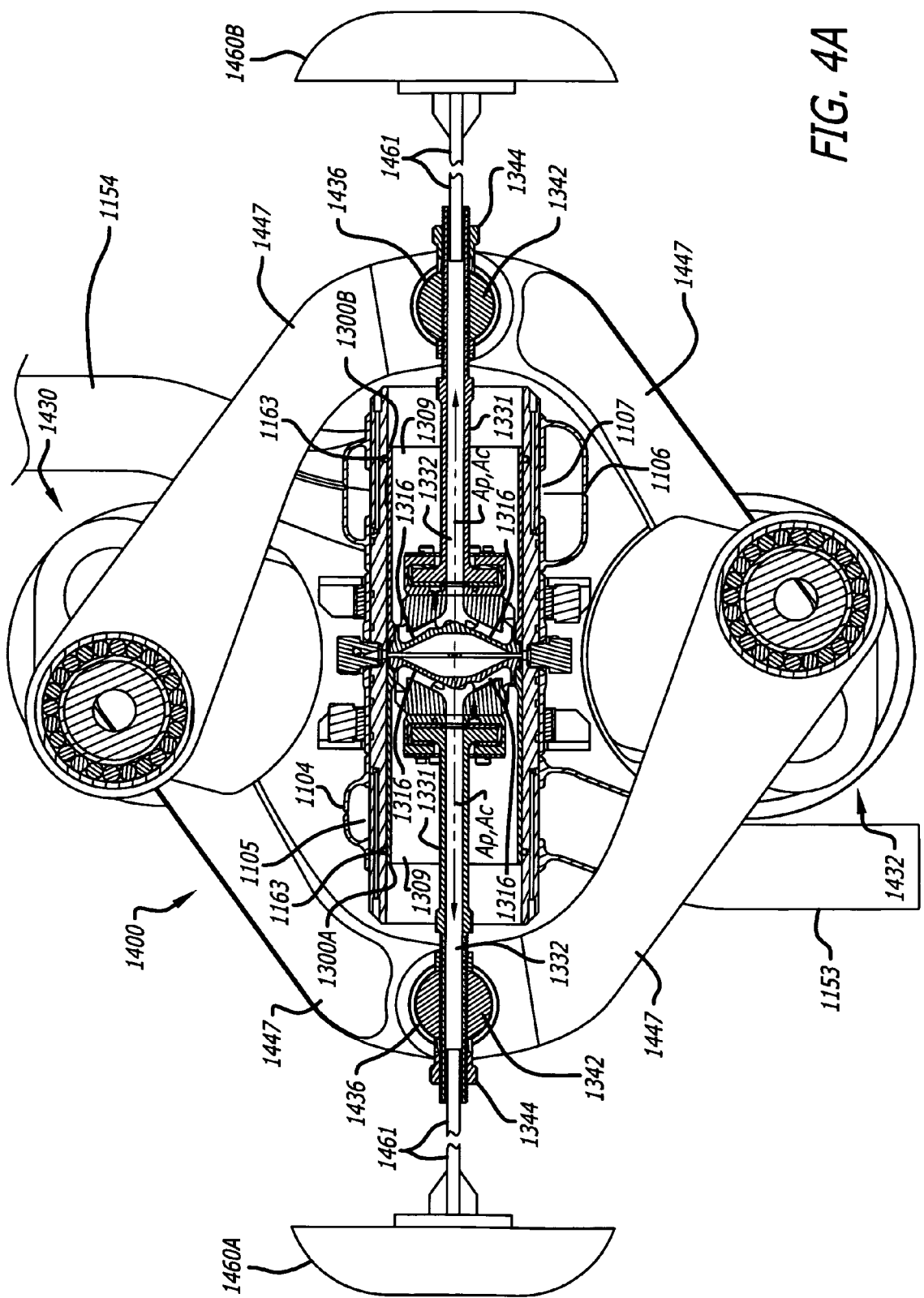
FIG. 4A is a side view of an opposed piston engine showing a cylinder in which the pistons at top dead center are coupled by primarily tensile-loaded connecting rods to two crankshafts, with the view cut away to show a piston cooling structure.

A two-cycle, opposed piston internal-combustion engine illustrated in FIG. 4A is now described. This description presumes a compression-ignition engine for the sake of illustration and example only. It could instead be a spark-ignited engine. The described engine is constituted of at least one cylinder with tailored cooling in which cylindrically non-uniform thermal distortion is eliminated or substantially reduced by application of streams of a liquid coolant in the manner described with respect to the cylinder 1100 illustrated in FIGS. 1A-1D. A cylinder of this engine has a pair of opposed pistons, in each of which thermally-induced radial distention is eliminated or substantially reduced by application of one or more streams of a liquid coolant in the manner described with respect to the piston 1300 illustrated in FIGS. 3A-3E. While the cylinder and pistons are separately cooled by application of a liquid coolant, tailored cooling of the cylinder together with symmetrical cooling of the pistons may be relied upon to cool these elements and to maintain mechanical clearance between them during engine operation, which may thereby eliminate the need for piston rings.

As shown in FIG. 4A, the engine 1400 includes at least one cylinder 1100 with opposed pistons 1300A and 1300B disposed in it for reciprocating opposed motion toward and away from each other and the center of the cylinder 1100. The longitudinal axis $A_c$ of the cylinder is collinear with the longitudinal axes $A_p$ of the pistons 1300A and 1300B. The pistons 1300A and 1300B are coupled to first and second side-mounted counter-rotating crankshafts 1430 and 1432 which, in turn, are coupled to a common output (not shown in this figure). A single wristpin 1342 is mounted to each of the pistons 1300A and 1300B by way of a piston rod 1330. Each of the wristpins 1342 connects ends of a plurality of connecting rods 1447 to a respective one of the pistons 1300A and 1300B. The perspective of FIG. 4A illustrates only two connecting rods 1447 for each piston, but it is to be understood that one or more additional connecting rods are not visible.

In FIG. 4A, the two side-mounted crankshafts 1430 and 1432 are disposed with their axes parallel to each other and lying in a common plane that intersects the cylinder 1100 at or near its longitudinal center and that is perpendicular to the longitudinal axis $A_c$ of the cylinder. The crankshafts rotate in opposite directions. The connecting rods 1447 are connected to crank throws on the crankshafts 1430 and 1432. In plan, each connecting rod 1447 has an elongate straight section extending from a crankshaft toward a wristpin. At the end of the straight section, each connecting rod 1447 curves toward one of the wristpins 1342. The curved shape of the connecting rods 1447 shortens the overall width of the engine, while providing clearance between the connecting rods and the ends of the pistons during engine operation.

Figure 4B:
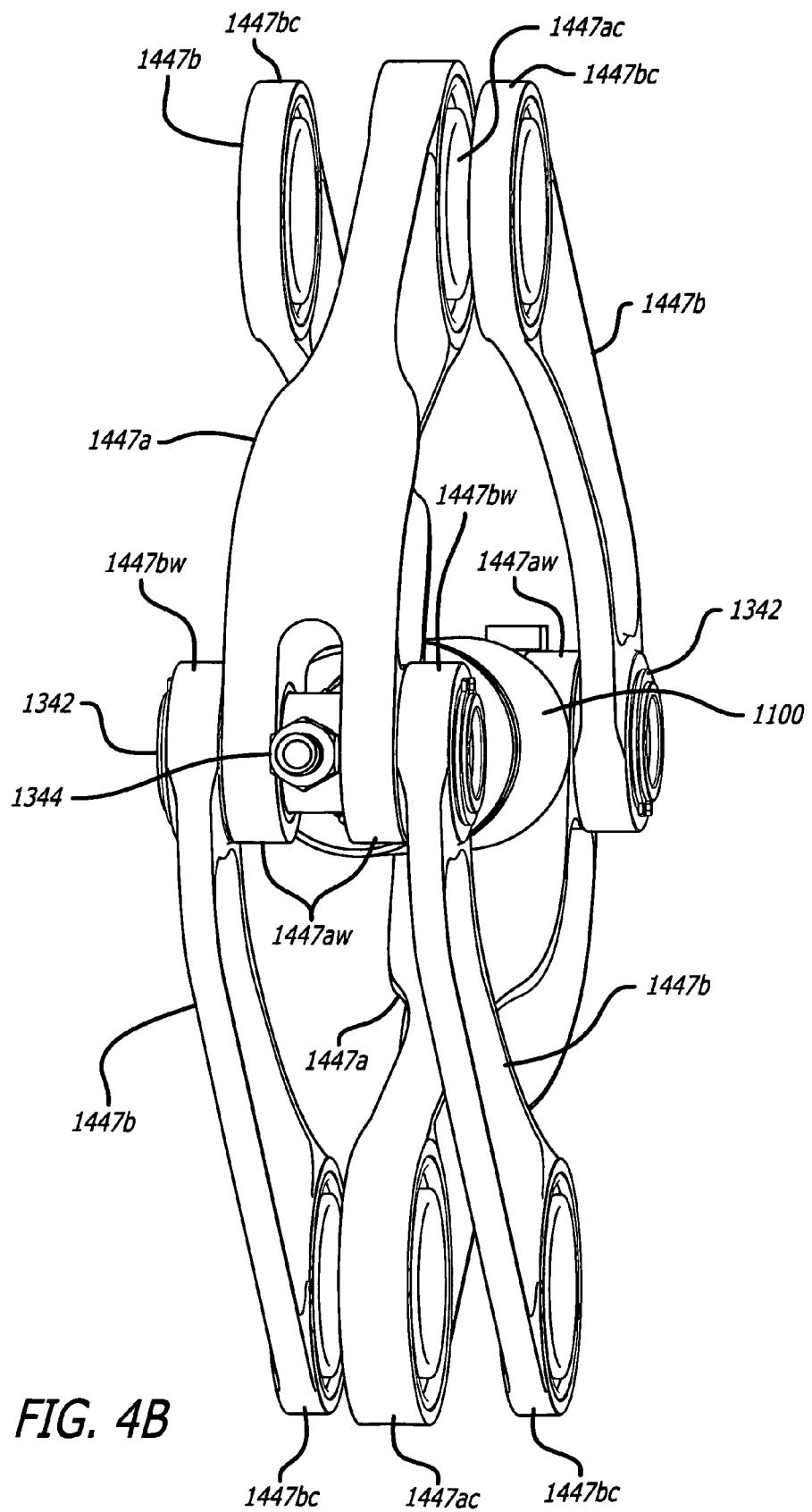
FIG. 4B is a perspective view of an end of a piston and connecting rods in the engine of FIG. 4A, with crankshafts removed.

FIG. 4B is a perspective view of an end of a piston 1300 in the engine 1400 with crankshafts removed to illustrate details of the connecting rods 1447. As seen in FIGS. 4A and 4B, each piston 1300A and 1300B has three connecting rods mounted to its single wristpin 1342. As discussed above, a centrally-mounted connecting rod 1447a has a forked wristpin end 1447aw with two laterally-spaced engaging arms having aligned openings (not seen) that are mounted, with needle bearings 1436, to the wristpin 1342. The centrally-mounted connecting rod 1447a has a crankshaft end 1447ac with an opening for mounting, with roller bearings 1438, to a crankshaft. Second, laterally mounted, connecting rods 1447b are mounted to a wristpin 1342, outboard of a first connecting rod 1447a, each between a respective end of the wristpin 1342 and one arm of the forked wristpin end 1447aw. Each second connecting rod 1447b has a wristpin end 1447bw having an opening for mounting, with a needle bearing 1436, to a wristpin 1342. Each second connecting rod 1447b has a crankshaft end 1447bc with an opening for mounting, with a roller bearing 1438, to a crankshaft.

The geometric relationship between the connecting rods 1447, wristpins 1342, and crankshafts 1430, 1432 shown in FIGS. 4A and 4B keeps the connecting rods 1447 principally under tensile stress as the pistons 1300A and 1300B move in the cylinder 1100, with a limited level of compressive stress resulting from inertial forces of the pistons at high engine speeds. This geometry eliminates or at least substantially reduces side forces between the pistons 1300A and 1300B and the bore of the cylinder 1100.

In FIG. 4A, additional details and features of the cylinder 1100 and the pistons 1300A and 1300B are shown. In the cylinder 1100, the exhaust port 1105 is covered by the exhaust manifold 1104 through which the products of combustion flow out of the cylinder 1100. During high power operation of the engine 1400, for example at BMEP=150 psi, the average external temperature of the exhaust manifold 1104 and the duct 1153 may reach or exceed 375° C., a high enough temperature to coke diesel fuel. The average temperature of the manifold 1104 and duct 1153 is reduced from the high initial exhaust gas temperature by the subsequent flow of scavenging air. Nevertheless, the exterior surfaces of exhaust manifold 1104 and the duct 1153 may be covered with an insulating coating such as a high temperature paint. Silicone-based compositions are useful for this purpose. One such composition is metal oxide filled paint with a thermal conductivity (K) of less than 1 W/meter-° K. sold under the trade name Corr-Paint CP4040 by Aremco. Another suitable composition is a coating formulated by mixing sil-cell spherical microballoons sold by Eager Plastics, Inc. or microspheres of glass sold by Potters Europe with a silicone based binder system sold under the trade name Aremco 8080 by Aremco; this composition provides a coating having a thermal conductivity (K) of less than 0.36 W/meter-° K. Alternatively, or in addition, the interior surfaces of the exhaust manifold 1104 and duct 1153 may be coated with a ceramic material. It may also be desirable to apply a liquid coolant to the exterior surfaces of the exhaust manifold 1104 and duct 1153, although this would make the energy removed from the exhaust gas unavailable for use in a turbocharger.

Referring to FIG. 4A, the cylinder 1100 also has an inlet port 1107 covered by the inlet manifold 1106 through which pressurized air flows into the cylinder 1100. Because of their locations with respect to these ports, the pistons 1300A and 1300B may be respectively referred to as the "exhaust" and "inlet" pistons, and the ends of the cylinder 1100 are similarly named.

The relation between piston length and the length of the cylinder, coupled with a phase difference between the pistons 1300A and 1300B as they traverse their bottom dead center positions, modulates port operations and sequences them correctly with piston events. Thus, a phase offset between the bottom dead center positions produces a sequence in which the exhaust port 1105 opens when the exhaust piston 1300A moves near its bottom dead center position, then the inlet port 1107 opens when the inlet piston 1300B moves near its bottom dead center position, following which the exhaust port closes after the exhaust piston moves away from its bottom dead center position, and then the inlet port 1107 closes after the inlet piston 1300B moves away from its bottom dead center position.

With reference to FIG. 4A, two coolant reservoirs 1460A and 1460B are provided outboard of the open ends of the pistons 1300A and 1300B. Each reservoir has an elongate nozzle 1461 that is received in the threaded nut 1344 mounted on the threaded end 1335 of the piston rod 1330. Liquid coolant for cooling the associated piston 1300A or 1300B is fed through the threaded nut 1344 from the reservoir 1460A or 1460B by way of the nozzle 1461. The liquid coolant is thus fed at a constant pressure into the bore 1332 of a corresponding piston rod 1330. The pressure forces liquid coolant out of the piston rod 1330 in one or more constantly-flowing streams directed onto the back surface of a crown 1308 through the flow passages 1329.

An opposed piston engine according to this specification has working elements (cylinders, pistons, linkages, crankshafts, etc.) received upon a structural unit in the form of a frame of passive structural elements fitted together to support the working elements. The frame bears the stresses and forces of engine operation, such as compressive forces between the crankshafts, and the cylinders are neither cast in a block nor formed with other passive structural elements. Each cylinder is supported in the engine frame and is thus decoupled from the mechanical and thermal stresses of an engine block. Hence, the cylinders 1100 are essentially only cooled pressure vessels. This engine construction, together with cooling of the cylinder 1100 and pistons 1300A and 1300B in the manner described above, eliminates non-uniform cylindrical distortion of the cylinder and swelling of the piston crowns, and permits the cylinder-piston interface to be very close-fitting. Advantageously, with tailored cooling, this characteristic affords the option of an engine design that may dispense with the need for piston rings.

Figure 5A:
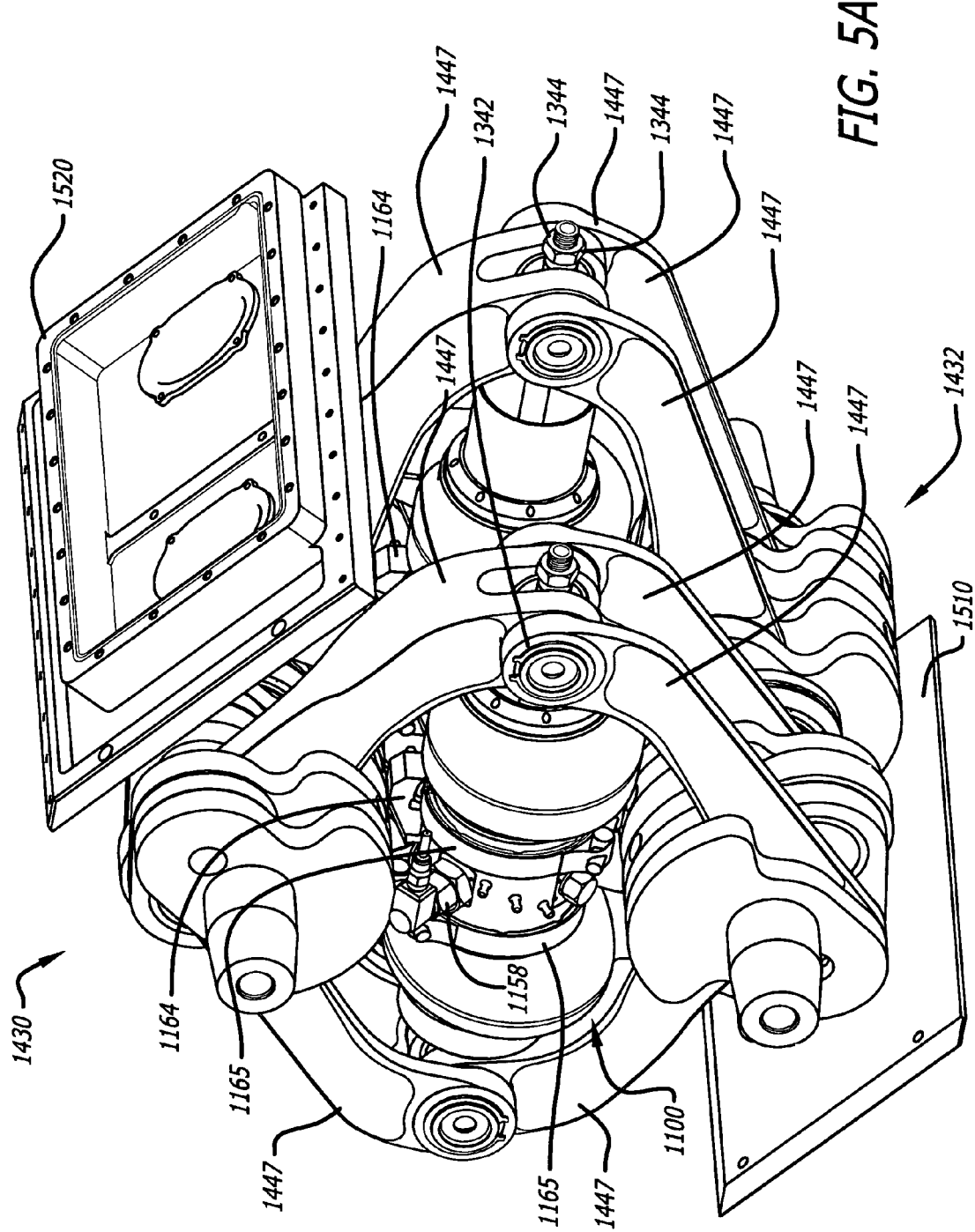

FIGS. 5A-5E are side perspective views showing increasingly complete assembly of the opposed piston engine 1400 with side-mounted crankshafts based on the cylinder and piston constructions of FIGS. 1A-1D and 3A-3C. The engine 1400 has two cylinders, although this is merely for the sake of illustration. In fact, it can be scaled to engines of any size and engines having one, two or three or more cylinders. In FIG. 5A, the engine 1400 includes two cylinders 1100 having the construction illustrated in FIGS. 1A-1D, with opposed pistons 1300A and 1300B disposed in it. The wristpins 1342 of the opposed pistons are visible in FIG. 5A. Connecting rods 1447 are coupled to the wristpins 1342 and to the crankshafts 1430 and 1432. The exhaust ducts 1153 are received in corresponding openings in an engine plate 1510, and the inlet ducts are received in corresponding openings of an engine plate 1520. At least one fuel injector 1158 injects fuel into the cylinder 1100. Pipes 1142, 1144, and 1145 conduct liquid coolant into respective groups of grooves on the outer surface of the cylinder 1100.

Figure 5B:
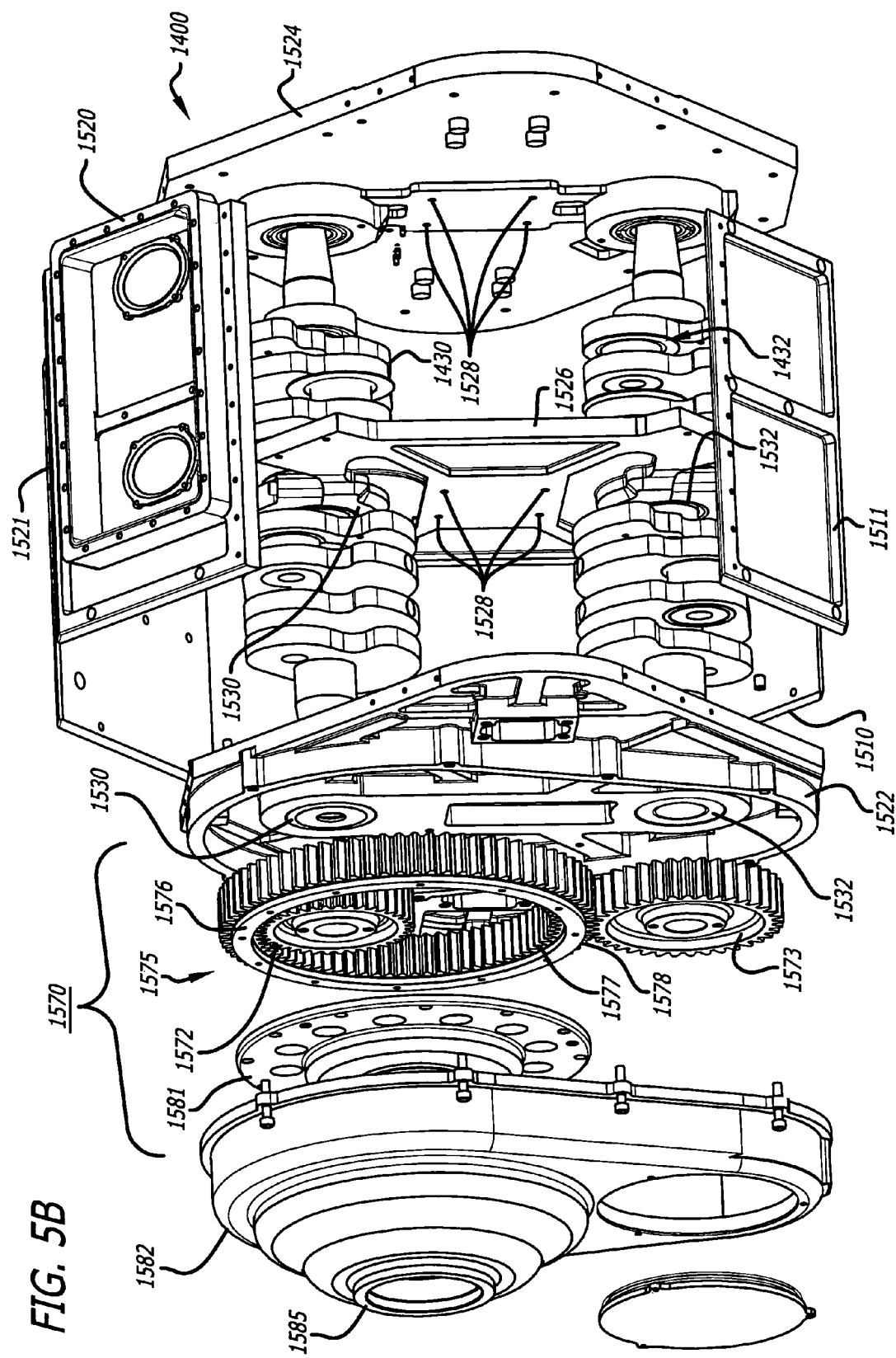
Figure 5C:
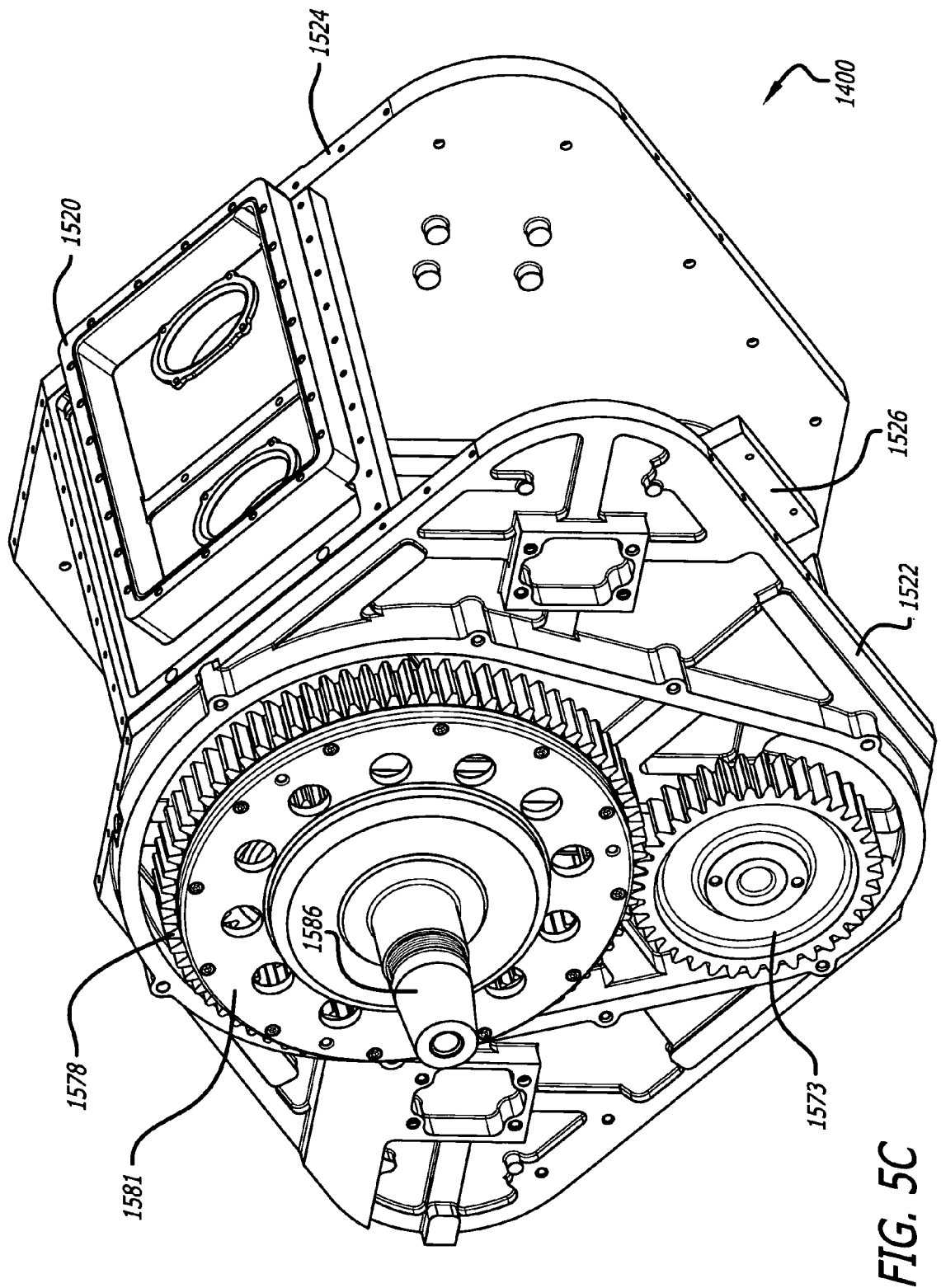

FIGS. 5B and 5C show the engine 1400 without cylinders, pistons and reservoirs. The engine 1400 has a frame constituted of end plates 1522 and 1524, and a middle plate 1526 positioned between the end plates 1522 and 1524. Through holes 1528 are provided through the plates 1524 and 1526 for mounting cylinders to the frame. The plates 1522, 1524 and 1526 have bearings 1530' for rotatably supporting the crankshaft 1430 and bearings 1532' for rotatably supporting crankshaft 1432. The end and middle plates 1522, 1524, and 1526 are held together on one side by a number of engine plates including engine plate 1510 and counterpart engine plate 1511, and on a second side by engine plate 1520 and counterpart engine plate 1521. One reservoir 1460 (shown in FIG. 4A) is mounted to one side of the frame between engine plates 1520 and 1511, the other to the other side of the frame between engine plates 1510 and 1521.

Continuing with the description of FIGS. 5B and 5C, the gearbox 1570 houses an output gear train through which the opposing rotational motions of the crankshafts 1530 and 1532 are coupled to an output drive shaft. The ends of the crankshafts 1430 and 1432 extend into the gearbox 1570. A gear wheel 1572 with a toothed outer rim is fixed to the end of the crankshaft 1430 and a gear wheel 1573 with a toothed outer rim is fixed to the end of the crankshaft 1432. An output gear wheel 1575 has an annulus 1576 with a toothed inside circumference 1577 and a toothed outside circumference 1578.

As seen in these figures, the outer rim of the gear wheel 1572 engages the inside circumference 1577 of the gear wheel 1575 at one location and the outer rim of the gear wheel 1573 engages the outside circumference 1578 of the gear wheel 1575 at another location diametrically opposite the one location. The gear ratio between the inner gear 1572 and the inside circumference 1577 may be 33/65 with MOD 4 teeth on the inner gear and the inside circumference, while the gear ratio between the outer gear 1573 and the outside circumference 1578 may be 33/65 with MOD 5 teeth on the outer gear and the outside circumference. This arrangement of gears permits the opposing rotations of the crankshafts 1430 and 1432 to be translated into the continuous rotation of the output gear wheel 1575 with an odd number of gears (three, in this case), with a non-integral gear ratio, and without any intermediary belts, chains, or other torque transfer elements. The result is a simple output gear train, shorter than that of Bird's engine, in which the crankshafts are commonly coupled by a single gear (the gear wheel 1575), which reduces torsional resonances between the crankshafts, as compared with Bird's engine As seen in FIGS. 5B and 5C, an axle plate 1581 is attached by threaded screws to the annulus 1576 and a cover 1582 is fastened by threaded screws to the end plate 1522, over the gearbox 1570. The axle plate 1581 has a central axle 1586. The cover 1582 includes an output bearing 1585 that receives the axle 1586, thus enabling the frame to support the output gear 1575 for rotation. The axle 1586 constitutes the output drive of the engine 1400. It may be coupled to an intermediate transmission or directly to the driven component by one or more shafts, gears, belts, chains, cams or other suitable torque transfer element or system (not shown).

Figure 5D:
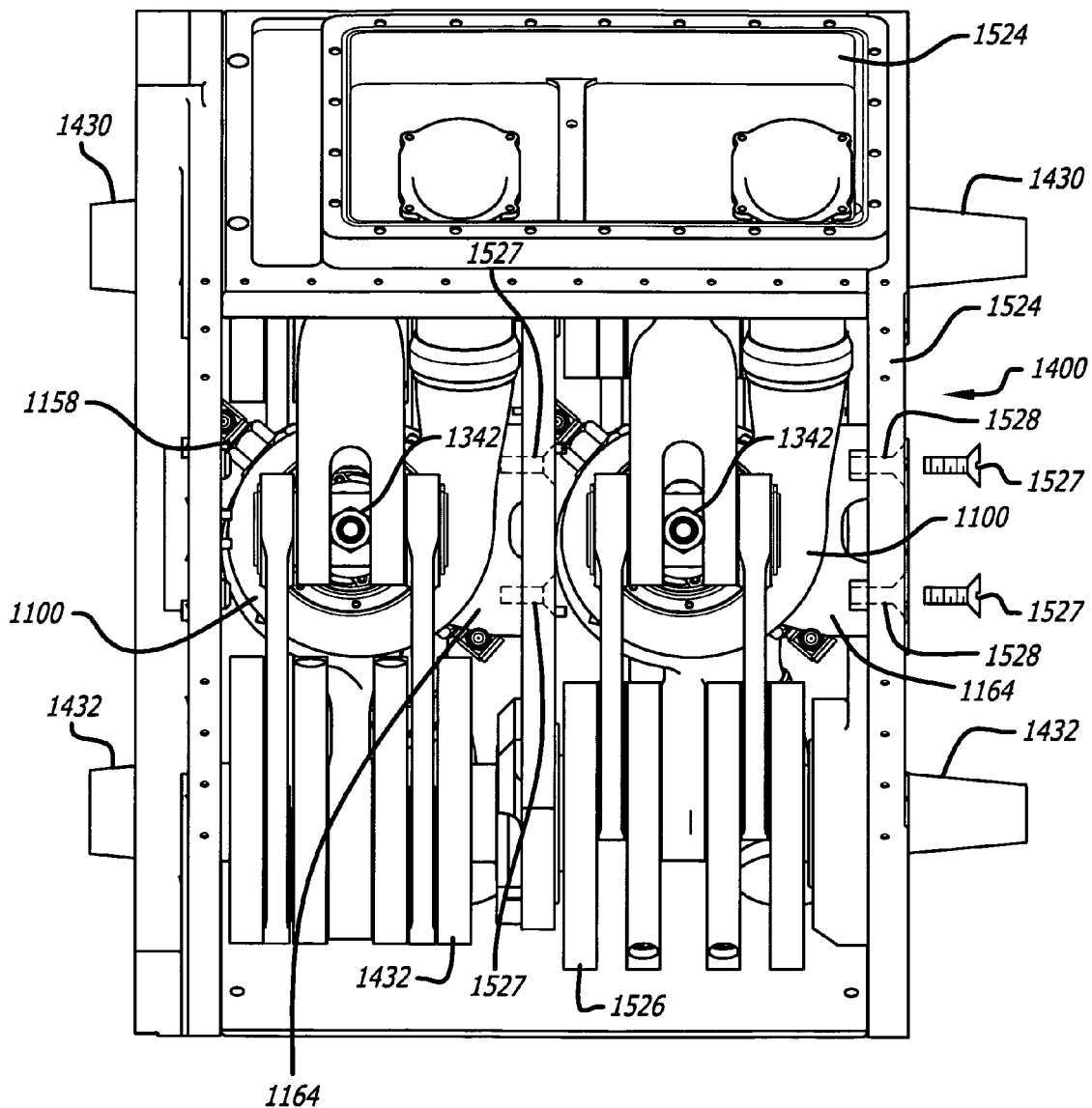

FIG. 5D shows the engine 1400 with two cylinders 1100 mounted to the end and middle plates 1524 and 1526 by threaded screws and/or bolts 1527 extending through holes 1528 in the plates 1524 and 1526 into threaded holes in the mounting brackets 1164. The threaded screws 1527 provide for easy removal of cylinders from the engine 1400 for inspection, repair, or replacement of cylinders or pistons. The assembled engine 1400 is seen in FIG. 5E, with reservoirs 1460A and 1460B mounted by threaded screws between the end plates 1522 and 1524. The engine plates 1520, 1521, 1510, and 1511, reservoirs 1460A and 1460B, and cover plates 1580 are mounted by threaded screws and/or bolts to the end and middle plates 1522, 1524, and 1526 of the frame.

The frame parts for the engine 1400 are preferably made of high temperature aluminum alloy (such as 5454 aluminum) that is cast and/or machined as necessary for assembly and operation of the engine. Engine fuel and scavenge systems may be as described below. Preferably, the liquid coolant and the fuel used for the engine 1400 are diesel fuel that may also serve as a lubricant for the pistons and other engine elements. Preferably, engine operations are controlled by way of an engine control unit (ECU) with associated sensors and actuators, as needed.

The mounting of auxiliary engine apparatus to the engine 1400 may be understood with reference to FIG. 5E. For example, a turbocharger 1590 is mounted to the engine plate 1510 for ease of coupling to one or more exhaust ducts and a supercharger 1591 is mounted to the engine plate 1520 for ease of coupling to inlet ducts. A fuel injection pump 1593 is driven by a timing belt from the end of one of the crankshafts. Coolant, lubricant and scavenging pumps (not shown) are mounted to the back of the engine 1400 and are driven by the end of one of the crankshafts. The coolant pump provides liquid coolant to the pipes in the cylinder sleeve 1140 and to the reservoirs 1460A and 1460B. A sump pump 1594 is mounted to the bottom plate 1580. Although not shown in these figures, the extensions of the crankshafts through the back plate 1524 may also be employed to drive vibration dampers and engine accessories.

Figure 6A:
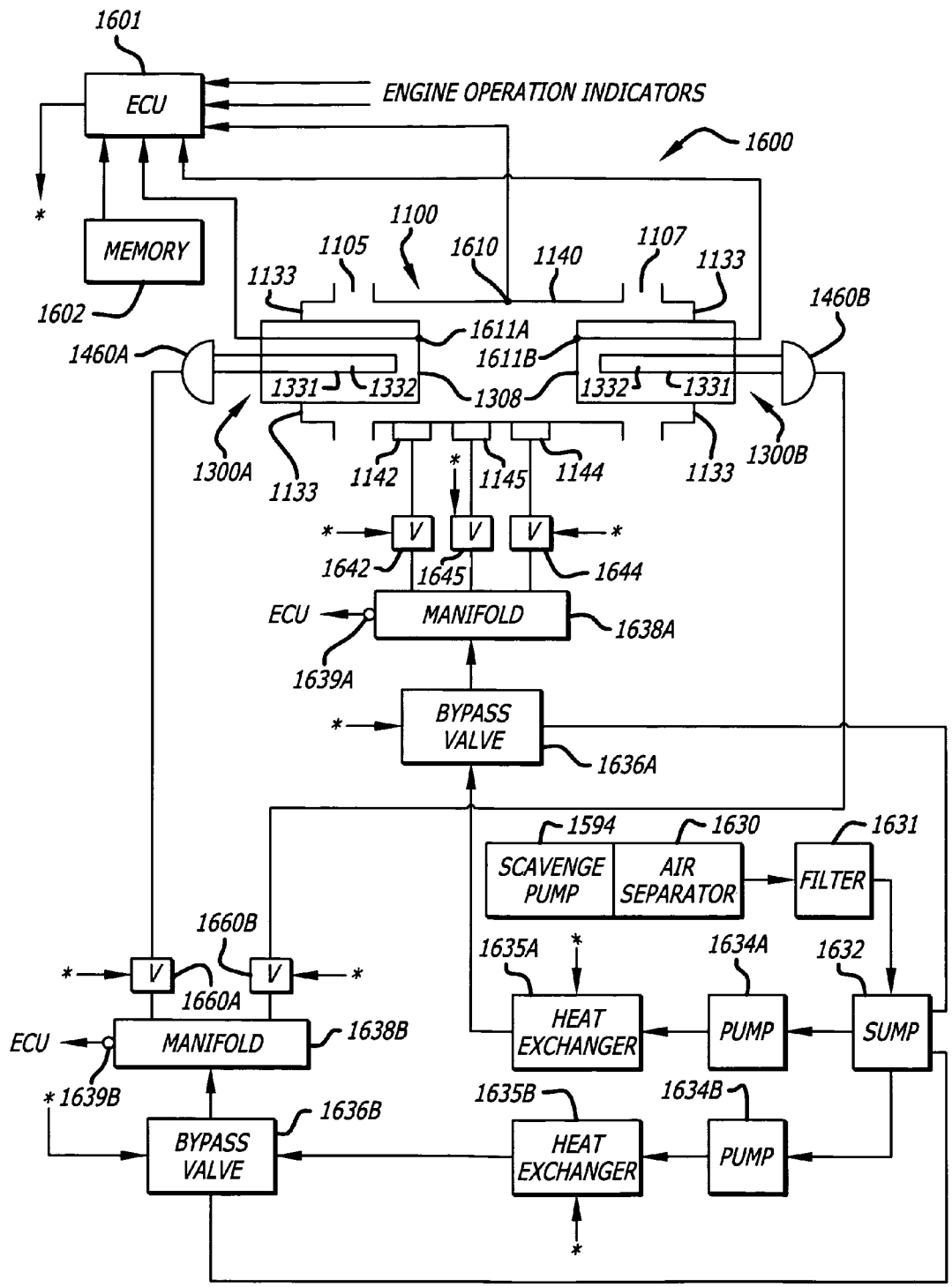
FIGS. 6A and 6B are schematic diagrams of supply systems useable to control the application of liquid coolant to a cylinder and opposed pistons of the opposed piston engine.

Control of the delivery of liquid coolant by a liquid coolant supply system 1600 useable in the second embodiment is illustrated in the schematic diagram of FIG. 6A. The supply system 1600 includes a programmable engine control unit (ECU) 1601. The ECU 1601 senses a temperature of the cylinder 1100 by way of a sensor 1610 threaded into one of the openings 1116 in the cylinder liner 1102. The ECU 1601 also senses temperatures of the crowns of the pistons 1300A and 1300B by way of sensors 1611A and 1611B mounted in the pistons 1300A and 1300B. Other sensors (not all shown) may provide inputs indicative of various engine operating conditions to the ECU 1601. In the supply system 1600, a scavenge pump 1594 recovers coolant exhausted from the cylinder 1100 and pistons 1300A and 1300B and pumps the coolant through an air separator 1630 and a filter 1631 to a (dry) sump 1632.

As illustrated in FIG. 6A, a cylinder coolant circuit pump 1634A pumps coolant collected in the sump 1632 through a heat exchanger 1635A and a bypass valve 1636A and into a manifold 1638A. Liquid coolant for provision to the grooves in the cylinder 1100 is maintained at a selected pressure in the manifold 1638A by control of the bypass valve 1636A by the ECU 1601 and a pressure sensor 1639A in the manifold 1638A. From the manifold 1638A, the liquid coolant flows through proportional valves 1642, 1644, and 1645 and into grooves on the outside surface of the cylinder 1100 via pipes 1142, 1144, and 1145, respectively. All of the valves 1636A, 1642, 1644, and 1645 are controlled by the ECU 1601.

As illustrated in FIG. 6A, a piston coolant circuit pump 1634B pumps coolant collected in the sump 1632 through a heat exchanger 1635B and a bypass valve 1636B into a manifold 1638B. Liquid coolant for provision to the piston rods 1330 in the pistons 1300A and 1300B is maintained at a selected pressure in the manifold 1638B by control of the bypass valve 1636B by the ECU 1601 and a pressure sensor 1639B in the manifold 1636B. From the manifold 1638B, the liquid coolant flows through proportional valves 1660A and 1660B into the reservoirs 1460A and 1460B and from the reservoirs, through the bores 1332 of the piston rods 1330 onto the back surfaces of the crowns in the pistons 1300A and 1300B. All of the valves 1636B, 1660A, and 1660B are controlled by the ECU 1601.

The ECU 1601 illustrated in FIG. 6A is programmed by mapping pre-calibrated values of cylinder and piston temperatures and other sensory data indicative of engine operating conditions to coolant pressures and flow rates for various engine operating loads. The ECU 1601 senses engine operating conditions and cylinder and piston temperatures, determines the current engine load and accesses and computes the required pressures and flow rates for the three circuits of the cylinder 1100 and the pistons 1300A and 1300B. The ECU 1601 then controls the valves 1636A, 1642, 1644, and 1645 to provide coolant to the coolant circuits of the cylinder 1100 as required at the current engine operating point. This control may be either open loop or closed loop. For example, at full engine power, using diesel fuel as the coolant, the pressure and flow rates provided to the pipes 1142 and 1144 may be less than 1 bar at 1 gallon per minute, and the pressure and flow rate provided to the pipes 1145 may be less than 1 bar at 4 gallon per minute. At the same time, the ECU 1601 also sets the valves 1636B, 1660A, and 1660B to provide coolant to the coolant circuits of the pistons 1300A and 1300B as required to control thermal distortion of the crowns 1308 at the current engine operating point. For example, at full engine power, using diesel fuel as the coolant, the pressure and flow rates provided to the reservoirs 1460A and 1460B may be less than 3 bar at 15 gallons per minute per piston.

Figure 6B:
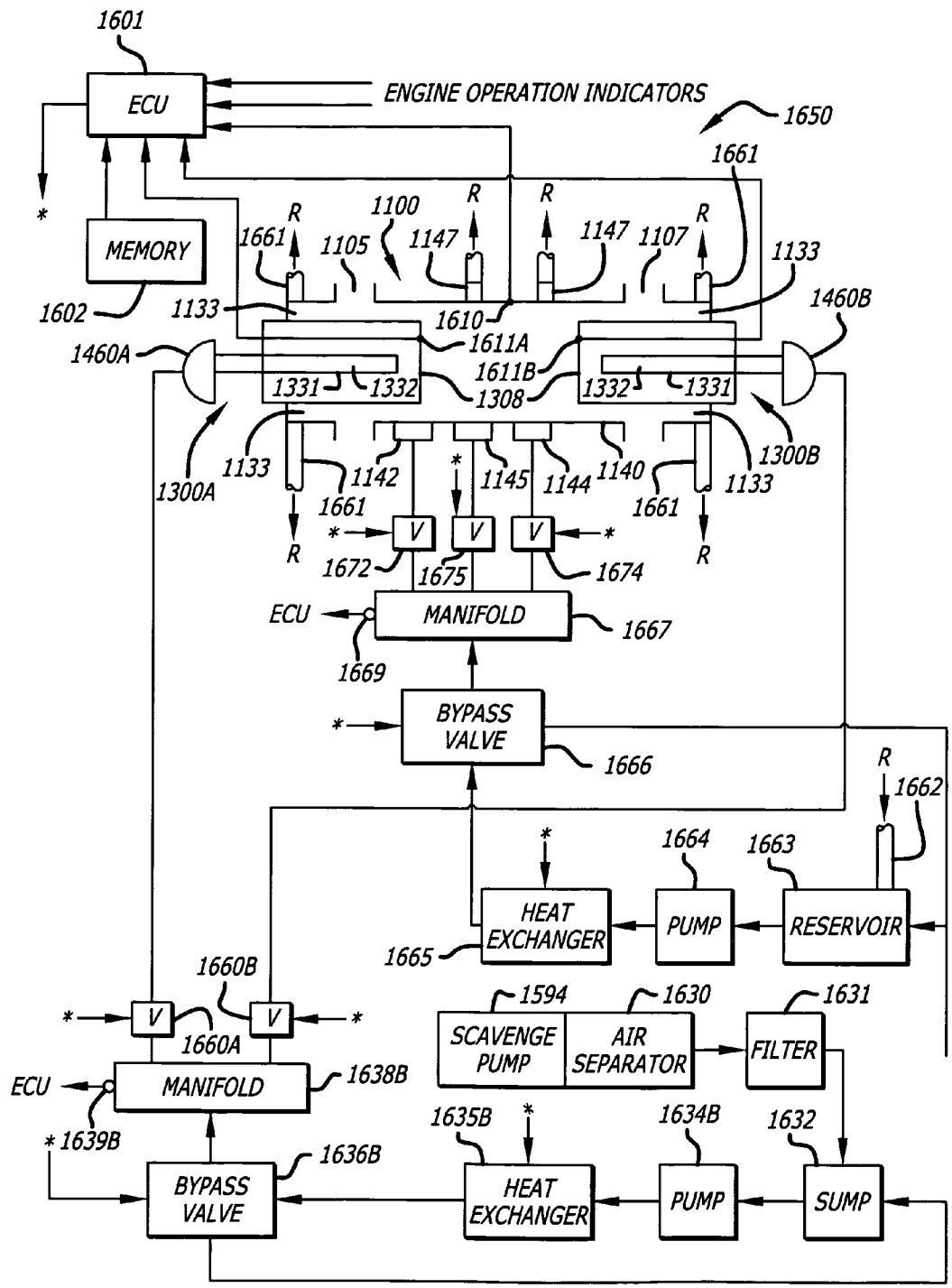

Control of the delivery of liquid coolant by an alternate liquid coolant supply system 1650 is illustrated in the schematic diagram of FIG. 6B. The system 1650 provides a first coolant (water, for example) to the cylinder 1100 and a second, different coolant (lubricant or diesel fuel, for example) to the pistons 1300A and 1300B. The supply system 1650 includes the programmable engine control unit (ECU) 1601 and the sensors 1610, 1611A, and 1611B in the cylinder 1100 and pistons 1300A and 1300B. The supply system 1650 utilizes liquid coolant return lines 1661 connected conventionally to the holes 1147 in the cylinder sleeve 1140 and the holes 1133 at the ends of the cylinder 1100. The liquid coolant return lines 1661 converge into a return manifold 1662 that returns the first liquid coolant from the cylinder 1100 to a reservoir 1663.

As seen in FIG. 6B, cylinder coolant circuit pump 1664 pumps the first liquid coolant collected in the reservoir 1663 through a heat exchanger 1665 and a bypass valve 1666 into a manifold 1667. First liquid coolant for provision to the grooves in the cylinder 1100 is maintained at a selected pressure in the manifold 1667 by control of the bypass valve 1666 by the ECU 1601 and a pressure sensor 1669 in the manifold 1667. From the manifold 1667, the first liquid coolant flows through proportional valves 1672, 1674, and 1675 into grooves on the outside surface of the cylinder 1100 through pipes 1142, 1144, and 1145, respectively. All of the valves 1666, 1672, 1674, and 1675 are controlled by the ECU 1601.

The supply system 1650 shown in FIG. 6B also includes the piston coolant circuits of the supply system 1600, which are constituted of the elements in sequence from the scavenge pump 1594 through the reservoirs 1460A and 1460B to deliver the second liquid coolant for cooling the pistons 1300A and 1300B as described above in connection with FIG. 6A. As with the system 1600, the second liquid coolant is streamed into the pistons 1300A and 1300B and recovered by the scavenge pump 1594.

The ECU 1601 illustrated in FIG. 6B is programmed and operates the supply system 1650 in the manner of the supply system 1600 to map pre-calibrated values of cylinder and piston temperatures and other sensory data indicative of engine operating conditions to first and second coolant pressures and flow rates for various engine operating loads, and to control the provision of the first and second liquid coolants at those pressure and flow rates to the cylinder 1100 and pistons 1300A and 1300B, respectively.

It should be evident that the liquid coolant supply systems of FIG. 6A and FIG. 6B can control the cooling of the cylinder 1100 independently of the pistons 1300A and 1300B in response to engine operating conditions by varying the flow rates and pressures of the liquid coolant applied to the cylinder 1100 separately from the flow rates and pressures of the liquid coolant applied to the pistons 1300A and 1300B. Thus, the liquid coolant supply systems can maintain the cylinder 1100 at the same or different temperatures as the pistons 1300A and 1300B, and can vary those temperatures independently in response to changing engine operating conditions. Independent control of the temperatures of the cylinder 1100 and the pistons 1300A and 1300B enables the liquid coolant supply systems to maintain mechanical clearance or spacing between the bore 1103 of the cylinder 1100 and the outside diameters of the pistons 1300A and 1300B within a desired range as engine operating conditions vary.

Fuel system embodiments for providing diesel fuel to the fuel injectors of an opposed piston engine such as that described herein are illustrated in FIGS. 9A-9C of the priority PCT Patent Application PCT/US2005/020553 ("the priority application"), which, as discussed above, is incorporated herein by reference. As is described in the cited passages, the liquid coolant provided to cool the cylinders and/or the pistons may be the diesel fuel also provided to power the opposed piston engine.

Figure 7:
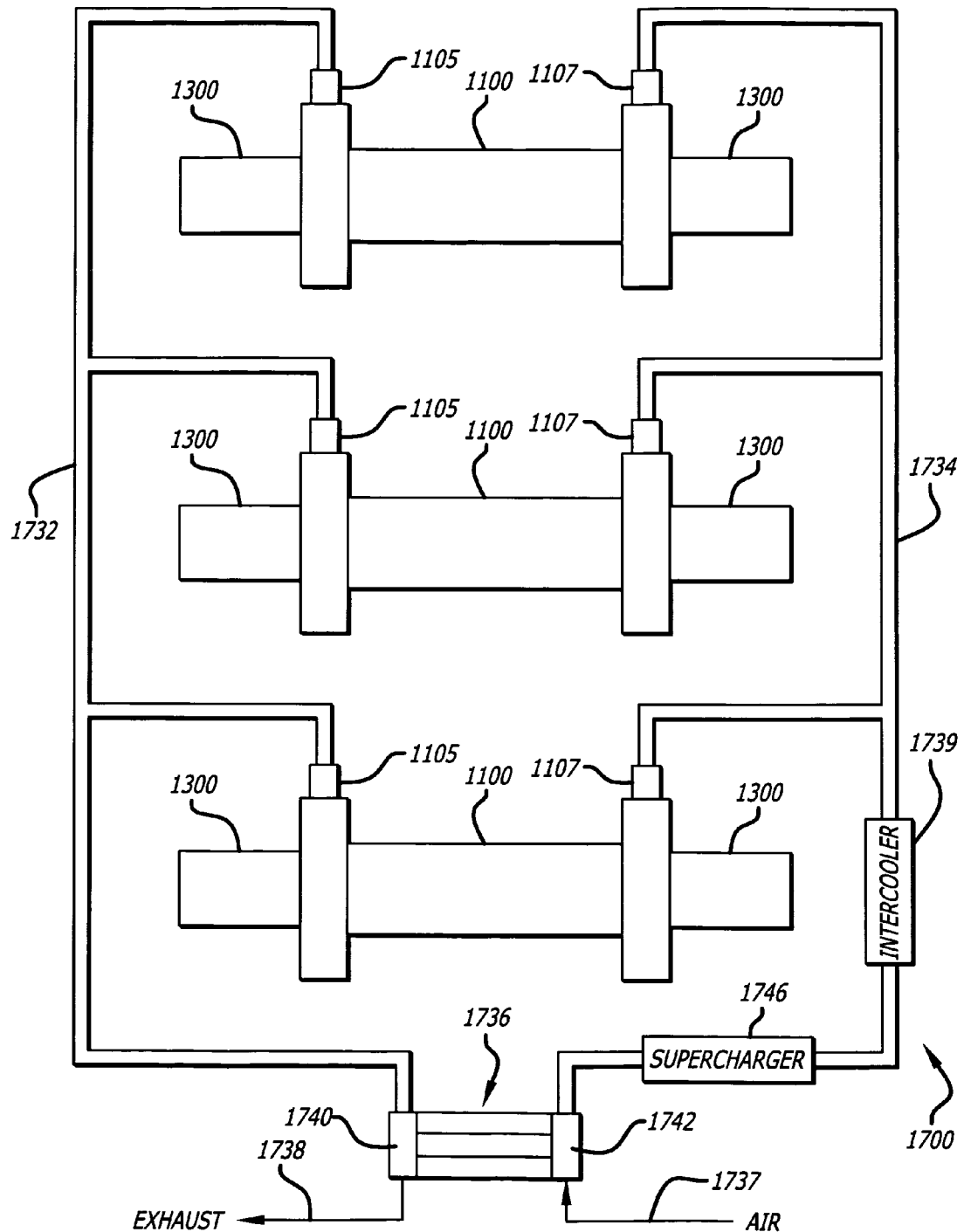
FIG. 7 is a schematic diagram of intake and exhaust gas flow in the opposed piston engine.

A system for providing charge air to and discharging exhaust gasses from the opposed piston engine 1400 is illustrated in FIG. 7. The system may scale to serve one or more cylinders 1100. In the system 1700, an air inlet manifold line 1734 and an exhaust manifold line 1732 are respectively connected to the inlet ports 1107 and the exhaust ports 1105 of one or more cylinders 1100. These manifold lines are preferably mounted outside the engine enclosure. The engine schematically illustrated in FIG. 7 is a turbo-supercharged or supercharged engine. Thus, the manifold lines are connected to a turbo-supercharger 1736. Specifically, the exhaust gases moving through the exhaust manifold line 1732 drive a turbine 1740 en route to an exhaust line 1738 to mechanically drive a compressor 1742. The compressor 1742 draws air in on an air inlet line 1737 and pressurizes the intake air before directing the intake air to the inlet manifold line 1734 by way of an intercooler 1739. A supercharger 1746 or equivalent device may be connected between the intercooler 1739 and the compressor 1742 and is mechanically driven to provide scavenge air for starting the engine.

The uses and applications of an opposed-piston engine set forth in this specification are many fold. It can be scaled for any application using two-cycle engines, including two-cycle diesel engines. The engine can be installed in or mounted on a variety of powered vehicles, tools, devices, or other apparatus requiring the delivery of rotary power. See FIGS. 8A-8F for examples in this regard. In FIG. 8A, this two-cycle opposed-piston engine 1400 is installed in a surface vehicle, which can include wheeled or tracked vehicles, such as automobiles, motorcycles, scooters, trucks, tanks, armored military vehicles, snow-mobiles, and all equivalent and similar instances. In FIG. 8B, this engine is installed in a water-going vehicle such as a boat, hovercraft, submarine, personal water craft, and all equivalent and similar vehicles. In FIG. 8C, this engine is installed in a fixed or rotary-wing aircraft. In FIG. 8D, this engine is installed in a powered implement such as a lawnmower, edger, trimmer, leaf blower, snow blower, chain saw, and all equivalent and similar devices. In FIG. 8E, this engine is installed in an electrical power generating device. In FIG. 8F, the engine is installed in a pumping device.

Although the invention has been described with reference to specific illustrations and examples, it should be understood that various modifications can be made without departing from the spirit of the principles of our engine. Accordingly, the invention is limited only by the following claims.

The invention claimed is:

1. A piston for an opposed piston engine, comprising:
   a cylindrical skirt with a crown and an open end opposite the crown;
   a piston rod with a bore, a first, disc-shaped end attached to a back surface of the crown, and a second end extending through the open end of the skirt;
   a radial array of liquid coolant flow passages in communication with the bore and disposed between the disc-shaped end and the back surface of the crown; and,
   a single wristpin retained on the second end of the piston rod and positioned externally to the piston.

2. The piston of claim 1, in which the liquid coolant flow passages are defined by a radial array of ribs abutting the back surface of the crown.

3. The piston of claim 1, further including at least one connecting rod received on the wrist pin.

4. The piston of claim 1, further including a first connecting rod with a forked end received on the wrist pin, and second connecting rods mounted to the wristpin, outboard of the first connecting rod.

5. The piston of claim 4, each second connecting rod mounted between a respective end of the wristpin and one arm of the forked end.

6. The piston of claim 1, further including a liquid coolant reservoir positioned outboard of the open end of the skirt with an elongate nozzle extending into the bore through the second end of the piston rod.

7. The piston of claim 6, further including a first connecting rod with a forked end received on the wrist pin, and second connecting rods mounted to the wristpin, outboard of the first connecting rod.

8. The piston of claim 7, each second connecting rod mounted between a respective end of the wristpin and one arm of the forked end.

9. A cylinder and piston combination for an opposed piston engine, comprising a cylinder and two pistons, in which
   the cylinder includes:
      a liner with a bore, an outside surface, and opposing ends;
      an exhaust port near an exhaust end of the liner;
      an inlet port near an inlet end of the liner;
      at least one fuel injector opening in a central portion of the liner;
      first liquid coolant grooves in the outside surface and extending from the central portion toward the exhaust end, the first liquid coolant grooves having a first cooling capacity; and,
      second liquid coolant grooves in the outside surface and extending from the central portion toward the inlet end, the second liquid coolant grooves having a second cooling capacity less than the first cooling capacity;
   each piston includes:
      a cylindrical skirt with a crown and an open end opposite the crown;
      a piston rod with a bore, a first, disc-shaped end attached to a back surface of the crown, and a second end extending through the open end of the skirt;
      a radial array of liquid coolant flow passages in communication with the bore and disposed between the disc-shaped end and the back surface of the crown; and,
      a single wristpin retained on the second end of the piston rod and positioned externally to the piston;
   and, the pistons are disposed crown-to-crown in the bore of the cylinder liner.

10. The cylinder and piston combination of claim 9, each piston further including at least one connecting rod received on the wrist pin.

11. The cylinder and piston combination of claim 9, each piston further including a first connecting rod with a forked end received on the wrist pin, and second connecting rods mounted to the wristpin, outboard of the first connecting rod.

12. The cylinder and piston combination of claim 11, each second connecting rod mounted between a respective end of the wristpin and one arm of the forked end.

13. The cylinder and piston combination of claim 9, further including a liquid coolant reservoir for each piston, the liquid coolant reservoir positioned outboard of the open end of the skirt of the piston with an elongate nozzle extending into the bore through the second end of the piston rod.

14. The cylinder and piston combination of claim 13, further including a first connecting rod with a forked end received on the wrist pin, and second connecting rods mounted to the wristpin, outboard of the first connecting rod.

15. The cylinder and piston combination of claim 14, each second connecting rod mounted between a respective end of the wristpin and one arm of the forked end.

16. A method of operating an internal-combustion engine with a cylinder and a pair of opposed pistons disposed in a bore of the cylinder, each piston including a crown, the method comprising:

applying a first amount of liquid coolant to a first portion of the cylinder extending from a central portion of the cylinder to an exhaust port of the cylinder;

applying a second amount of liquid coolant to a second portion of the cylinder extending from the central portion to an inlet port of the cylinder;

in which the first amount is greater than the second amount;

applying radially symmetric streams of liquid coolant to a back surface of each piston crown; and, elastically deforming a compliant piston boot in response to a side force acting between the piston and the cylinder.

17. The method of claim 16, in which the cylinder includes exhaust and inlet ends and the first amount of liquid coolant flows out of the exhaust end, the second amount of liquid coolant flows out of the inlet end, and liquid coolant flows out of an open end of each piston.

18. The method of claim 17, in which more liquid coolant contacts a first cylinder liner portion extending from a central portion of the liner to the exhaust port than a second cylinder liner portion extending from the central portion to the inlet port.

19. The method of claim 17, further comprising applying liquid coolant in a circumferential direction around the central portion of the cylinder.

20. The method of claim 16, further comprising applying liquid coolant in a circumferential direction around the central portion of the cylinder.

* * * * *